(12) United States Patent
Nishigori et al.

(10) Patent No.: US 6,600,785 B1
(45) Date of Patent: Jul. 29, 2003

(54) IMAGE PROCESSOR, IMAGE DATA PROCESSOR AND VARIABLE LENGTH ENCODER/DECODER

(75) Inventors: Yoshihisa Nishigori, Ikeda (JP); Tetsuya Imamura, Osaka (JP); Takayasu Miki, Hirakata (JP); Kenjiro Tsuda, Hirakata (JP); Akira Yoneyama, Higashiosaka (JP); Takatoshi Nada, Yawata (JP); Hideyuki Oogose, Katano (JP); Hironori Nakano, Katano (JP); Yoshimori Nakase, Kawachinagano (JP); Satoru Inagaki, Suita (JP); Yoshimasa Sogou, Osaka (JP)

(73) Assignee: Matsushita Electric Industrial, Osaka (JP)

(*) Notice: Subject to any disclaimer, the term of this patent is extended or adjusted under 35 U.S.C. 154(b) by 0 days.

(21) Appl. No.: 09/355,189
(22) PCT Filed: Nov. 27, 1998
(86) PCT No.: PCT/JP98/05354
§ 371 (c)(1),
(2), (4) Date: Jul. 28, 1999
(87) PCT Pub. No.: WO99/29112
PCT Pub. Date: Jun. 10, 1999

(30) Foreign Application Priority Data

Dec. 1, 1997 (JP) .............................. 9-330598
Dec. 1, 1997 (JP) .............................. 9-330599

(51) Int. Cl.⁷ ................................. H04N 7/18
(52) U.S. Cl. ............................. 375/240.23; 375/240.21
(58) Field of Search ........................ 375/240.12–240.24

(56) References Cited

U.S. PATENT DOCUMENTS 5,812,787 A * 9/1998 Astle ..................... 348/586
5,973,744 A * 10/1999 Kim ..................... 375/240.24

FOREIGN PATENT DOCUMENTS

| JP | 4-250773 | 9/1992 |
| JP | 5-64175 | 3/1993 |
| JP | 6-233271 | 8/1994 |
| JP | 6-237386 | 8/1994 |
| JP | 7-222151 | 8/1995 |
| JP | 8-275148 | 10/1996 |
| JP | 9-16160 | 1/1997 |
| JP | 9-93139 | 4/1997 |

* cited by examiner

Primary Examiner—Andy Rao
(74) Attorney, Agent, or Firm—Smith, Gambrell & Russell, LLP

(57) ABSTRACT

A picture processor including a picture-deformation-information input section for inputting the information for the degree of enlargement/contraction of each portion of a picture; a decoding section for inputting encoded picture data of the picture, inputting the information for the degree of enlargement/contraction of each portion of the picture from the picture-deformation-information input section, decoding the picture data every portion of the picture in accordance with the information for the degree of enlargement/contraction, and moreover decoding the whole picture data independently of the information for the degree of enlargement/contraction; a reference picture generation section for generating a reference picture enlarged or contracted for each portion of the picture by using a picture in which the whole picture data is decoded supplied from the decoding section, the information for the degree of enlargement/contraction of each portion of the picture from the picture-deformation-information input section, and the movement vector of the picture data; and an addition section for adding a picture decoded for each portion of the picture supplied from the decoding section and a reference picture supplied from the reference-picture generation section.

3 Claims, 24 Drawing Sheets

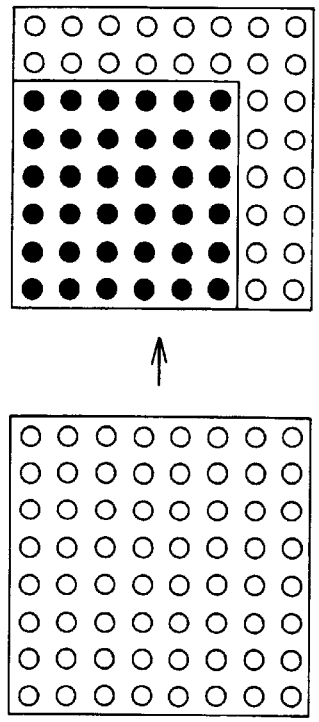
Fig. 5 (a)
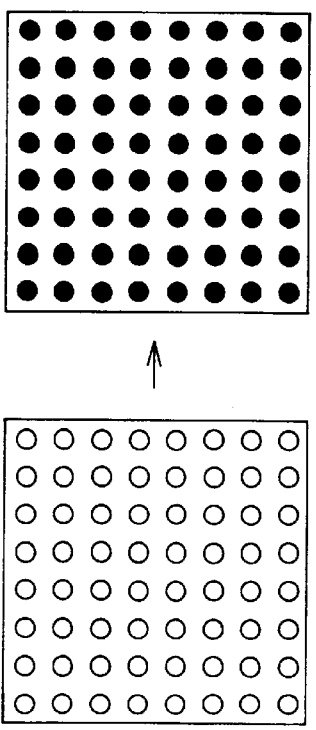
Fig. 5 (b)
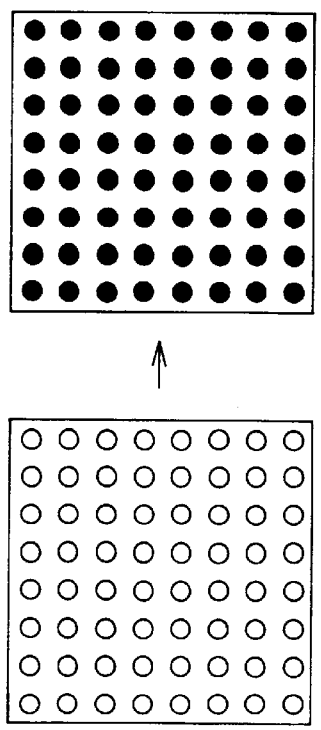
Fig. 5 (c)
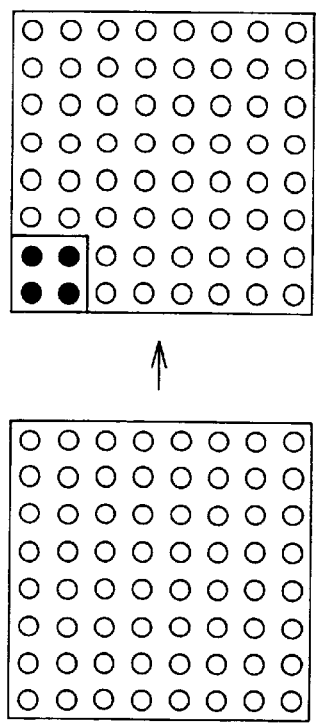
Fig. 5 (d)
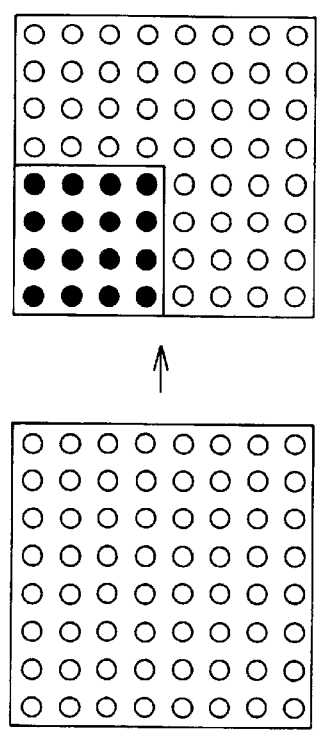

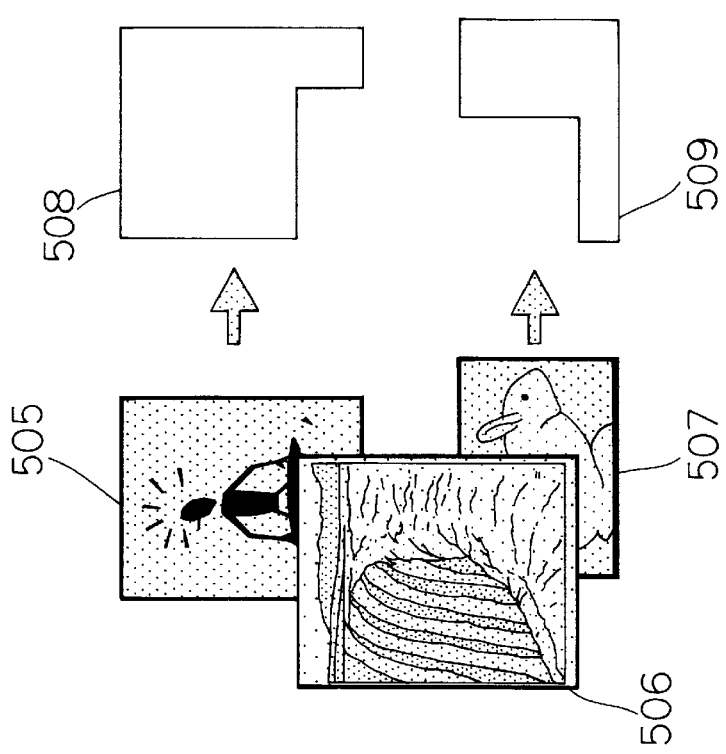
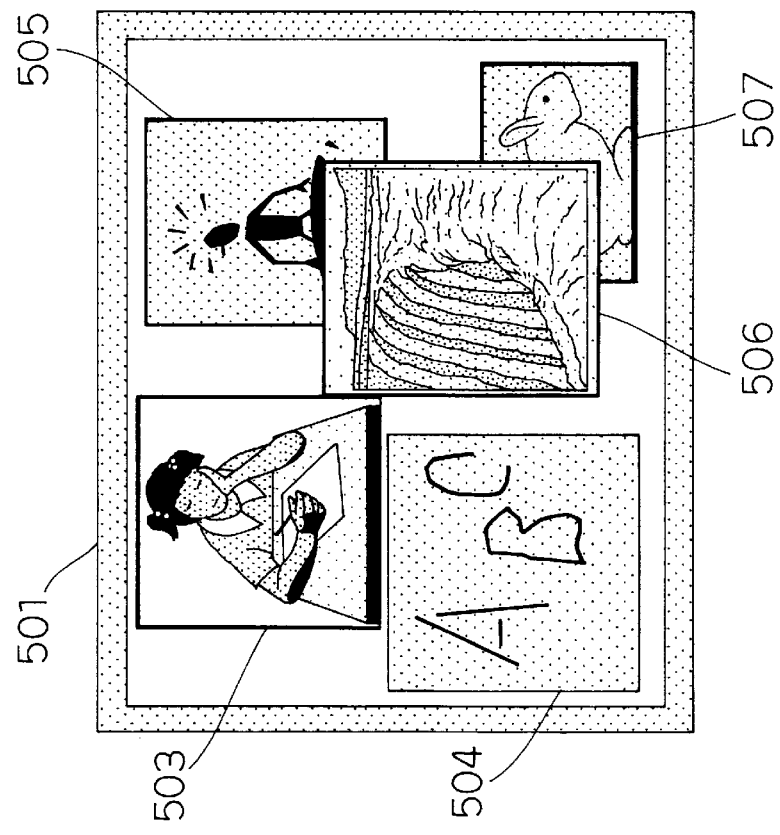
Fig. 14(a)
Fig. 14(b)

IMAGE PROCESSOR, IMAGE DATA PROCESSOR AND VARIABLE LENGTH ENCODER/DECODER

TECHNICAL FIELD

The present invention relates to a picture processor for deforming a picture to be displayed on a display of a personal computer or the like.

Moreover, the present invention relates to a picture data processor for processing the picture data for a plurality of pictures when displaying the pictures on a display.

Furthermore, the present invention relates to a variable-length-code decoder for variable-length-decoding a plurality of variable-length-encoded MPEG picture data values.

BACKGROUND ART (1) Orthogonal-transformation-system encoded picture data such as MPEG or DV has been used so far as digital data serving as an original picture for computer graphics to be displayed on a display of a personal computer or the like.

There is a mapping apparatus for decoding the encoded picture data such as MPEG and DV shown in FIG. 7(a), deforming a picture 15 obtained by decoding the encoded data, and mapping the deformed picture on, for example, a room wall 17 formed through computer graphics on a display 16 of a personal computer or the like as shown in FIG. 7(b).

Hereafter, an MPEG picture mapping apparatus for mapping a picture obtained from the MPEG picture data and a DV picture mapping apparatus for mapping a picture obtained from the DV picture data are described below in order by referring to the accompanying drawings.

First, a conventional MPEG-picture mapping apparatus is described.

FIG. 8 shows a block diagram of the conventional MPEG-picture mapping apparatus.

VLD means 1 inputs and variable-length-decodes variable-length-encoded MPEG picture data, inverse-quantization means 2 inversely quantizes the variable-length-decoded MPEG picture data, and IDCT means 3 decodes the inversely-quantized MPEG picture data. When the IDCT means 3 decodes the inversely-quentized MPEG picture data, it decodes all MPEG picture data values every block of an MPEG picture having a plurality of 8×8 DCT coefficients.

When the MPEG picture data input by the VLD means 1 is the data for an in-frame encoded picture (hereafter referred to as I-picture), the IDCT means 3 outputs a decoded picture to format transformation means 12 by passing the picture through addition means 7 and moreover, outputs the picture to a frame buffer 8. The frame buffer 8 stores decoded pictures supplied from the IDCT means 3.

However, when the MPEG picture data input by the VLD means 1 is the data for an inter-frame forward-prediction encoded picture (hereafter referred to as P-picture) or the data for an inter-frame bidirectional-estimation encoded picture, the frame buffer 8 already inputs an I-picture once or already stores the I-picture or a P-picture perfectly-decoded picture in which a movement vector and a difference picture are added to the I-picture. In this case, the IDCT means 3 outputs a movement vector supplied from the inverse-quantization means 2 to movement compensation means 9 through the frame buffer 8 and the movement compensation means 9 generates a movement-compensated picture in which only a movement vector is compensated by adding only the movement vector to a perfect picture stored in the frame buffer 8. Then, the addition means 7 adds the movement-compensated picture supplied from the movement compensation means 9 and a decoded difference picture supplied from the IDCT means 3 each other and outputs an added picture to the format transformation means 12 and also, outputs the picture to the frame buffer 8. Moreover, the frame buffer 8 stores perfect decoded pictures supplied from the addition means 7.

Then, the format transformation means 12 transforms a YUV-format picture supplied from the IDCT means 3 or addition means 7 into an RGB-format picture and outputs the RGB-format picture to picture deformation means 18.

The picture deformation means 18 inputs the RGB-format picture from the format transformation means 12 and moreover inputs the information for the degree of enlargement or contraction of each portion of the picture from CG original-data generation means 4 through deformation information generation means 5, deforms the picture supplied from the format transformation means 12 by interpolating or thinning pixels of each portion of the picture in accordance with the information for the degree of enlargement or contraction, and outputs the deformed picture to mapping means 13.

The mapping means 13 maps a picture supplied from the picture deformation means 18 to a predetermined position on the display of a personal computer or the like in accordance with the mapping-position information of a picture supplied from the CG original-data generation means 4.

Then, a conventional DV-picture mapping apparatus is described below.

FIG. 9 shows a block diagram of the conventional DV-picture mapping apparatus.

VLD means 1 inputs and variable-length-decodes variable-length-encoded DV picture data, inverse-quantization means 2 inversely quantizes the variable-length-decoded DV picture data, and IDCT means 3 decodes the inversely-quantized DV picture data. When the inversely-quantized DV picture data is decoded, the IDCT means 3 decodes all DV picture data values every block of the DV picture having a plurality of 8×8 DCT coefficients. Moreover, the IDCT means 3 outputs partial pictures decoded every block to deshuffling means 14.

The partial pictures decoded every block output by the IDCT means 3 are not orderly output like the following: for example, from the top block of the leftmost column of the entire picture constituted of the partial pictures to the bottom block and moreover, from the top block of the second column from the top left to the bottom block. That is, the sequence of partial pictures input by the deshuffling means 14 is shuffled. Therefore, the deshuffling means 14 deshuffles the partial pictures supplied from the IDCT means 3, orderly arranges them, and generates a perfect DV picture.

Then, format transformation means 12 transforms a YUV-format picture supplied from the deshuffling means 14 into an RGB-format picture and outputs the RGB-format picture to picture deformation means 18. Subsequent DV-picture operations are the same as those of the above-described MPEG-picture mapping apparatus.

As described above, as for the conventional MPEG-picture mapping apparatus and DV-picture mapping apparatus, a picture input by the format transformation means 12 is a full-size, picture in which pixels of the picture are interpolated or thinned every portion of the picture in accordance with the information for the degree of enlargement or contraction of each portion of the picture in the picture deformation means 18.

However, it is preferable that the picture input by the format transformation means 12 is a picture deformed under decoding in accordance with the information for the degree of enlargement or contraction of each portion of the picture.

It is an object of the first aspect of the present invention to provide a picture processor for deforming a picture in accordance with the information for the degree of enlargement or contraction of each portion of the picture when decoding encoded picture data by considering the problem that the above picture deformation was not performed conventionally when decoding the encoded picture data.

(2) Moreover, as described above, it has been more important in recent years to reproduce MPEG picture data and display a picture on the display of a personal computer or the like. The throughput for decoding or the like until displaying the MPEG picture data as a picture is very large. Therefore, an apparatus for processing the MPEG picture data can only process one MPEG picture data value at one time.

A conventional method for decoding MPEG picture data and displaying a picture on the display window of a personal computer is described below. Because there are two types of conventional methods, they are described separately.

The first method is a method for completely decoding MPEG picture data to reproduce a picture, interpolating or thinning pixels so as to fit the picture to the size and shape of a window, and displaying the picture on the window.

The second method is a method for selecting all or some of DCT coefficients of MPEG picture data in accordance with the size and shape of a window before decoding the MPEG picture data and directly decoding the DCT coefficients or decoding all the DCT coefficients by adding a predetermined number of zeros to a high-frequency region, and displaying the decoded picture on a window by interpolating or thinning pixels so as to fit the picture to the size and shape of the window.

Moreover, a window system has been spread which decodes a plurality of MPEG picture data values and simultaneously displays a plurality of pictures on the display of a personal computer or the like. For example, a window system is used which displays a picture supplied from a DVD on the display of a personal computer and simultaneously displays a picture supplied from a CD-ROM on the same display.

As described above, to display a plurality of pictures on the same display at the same time, the above first or second method prepares a picture data processor for each picture and reproduces and displays the picture so as to fit the picture to the size and shape of each window. These conventional picture data processors have a throughput capable of forming a large picture even if a picture to be formed is very small.

As described above, a conventional picture data processor cannot simultaneously process two MPEG picture data values or more.

Therefore, to reproduce a plurality of MPEG picture data values and display a plurality of pictures on the display of a personal computer or the like at the same time, picture data processors equal to the number of pictures to be displayed are necessary. That is, picture data processors equal to the number of pictures, respectively corresponding to the size and shape of each picture to be displayed and respectively having a large throughput are necessary independently of the amount of MPEG picture data to be processed.

It is an object of the second aspect of the present invention to provide a picture data processor capable of flexibly processing a plurality of MPEG picture data values even when reproducing a plurality of MPEG picture data values and simultaneously displaying a plurality of pictures on the display of a personal computer or the like by considering the problem that picture data processors equal to the number of pictures and respectively having a large throughput are conventionally necessary when reproducing a plurality of MPEG picture data values and displaying a plurality of pictures on the display of a personal computer or the like.

(3) Moreover, MPEG picture data values supplied from a plurality of data streams are decoded to display a plurality of pictures on the display of a personal computer or the like. Variable-length-encoded data values are included in the MPEG picture data values and the variable-length-encoded data values are first variable-length-decoded and then decoded into pictures.

A conventional variable-length-code decoder for variable-length-decoding a plurality of variable-length-encoded MPEG picture data values like the above mentioned is described below by referring to the accompanying drawings.

FIG. 26 shows a block diagram of a conventional variable-length-code decoder. The conventional variable length-code decoder is constituted of a first variable-length-data decoding circuit 5400, a second variable-length-data decoding circuit 5500, a third variable-length-data decoding circuit 5600, . . . , and an nth variable-length-data decoding circuit 5700 and each of the variable-length-data decoding circuits has a shift circuit 58 and an encoded-word decoding circuit 59.

The format of a picture of data is analyzed, for example, it is checked by a first MPEG-data hierarchical-structure decoding circuit 1099 whether the variable-length-encoded MEG picture data supplied from a first picture-code generation source 600 is constituted of a movement vector and difference data and the format is input to the first variable-length-data decoding circuit 5400.

Then, the first variable-length-data decoding circuit 5400 variable-length-decodes variable-length-encoded MPEG picture data and outputs the data to an information-source decoder group 1400. The variable-length decoding is described later.

Similarly, each of the formats of variable-length-encoded MPEG picture data values supplied from a second picture-code generation source 700, a third picture-code generation source 800, . . . , and an nth picture-code generation source 900 is analyzed by a second MPEG-data hierarchical-structure decoding circuit 1100, a third MPEG-data hierarchical-structure decoding circuit 1200, . . . , and an nth MPEG-data hierarchical-structure decoding circuit 1300 and input to the second variable-length-data decoding circuit 5500, third variable-length-data decoding circuit 5600, and nth variable-length-data decoding circuit 5700.

Then, each of the second variable-length-data decoding circuit 5500, third variable-length-data decoding circuit 5600, . . . , and nth variable-length-data decoding circuit 5700 variable-length-decodes variable-length-encoded MPEG picture data and outputs the data to the information-source decoder group 1400.

Thereafter, the information-source decoder group 1400 decodes the variable-length-decoded MPEG picture data supplied from each of the first variable-length-data decoding circuit 5400, second variable-length-data decoding circuit 5500, third variable-length-data decoding circuit 5600, . . . , and nth variable-length-data decoding circuit 5700 to generate a picture corresponding to the data supplied from each variable-length-data decoding circuit.

Then, variable-length decoding performed by each variable-length-data decoding circuit is further described below.

For the description, FIG. 6 shows an example of variable-length-encoded MPEG picture data input by a variable-length-data decoding circuit. Symbols A, B, C, and D in FIG. 6 denote n-, m-, l-, and o-bit variable-length-encoded words respectively, which are assumed to be continues.

The shift circuit 58 of a variable-length-data decoding circuit inputs a word length-capable of sufficiently storing the maximum word length of variable-length-encoded MPEG picture data and temporarily stores the word length. To simplify description, it is assumed that the data to be temporarily stored is constituted of the encoded words A, B, C, and D in FIG. 6.

Because the number of bits of a code length of each encoded word is unknown, the encoded word decoding circuit 59 detects the foremost encoded word of the variable-length-encoded data input by the shift circuit 58 and the length of the encoded word by using a uniquely-separable table. That is, the encoded word decoding circuit 59 detects the encoded word A in FIG. 6 and that the encoded word A has a word length of n bits.

Moreover, the encoded word decoding circuit 59 variable-length-decodes the foremost encoded word and outputs the variable-length-decoded data to the information-source decoder group 1400 and moreover, outputs the information for the number of bits of the code length of the output data to the shift circuit 58. That is, the encoded word decoding circuit 59 variable-length-decodes the encoded word A and outputs it to the information-source decoder group 1400 and moreover outputs the information that the output data had a word length of n bits to the shift circuit 58.

Thereafter, the shift circuit 58 receives the variable-length-encoded data equivalent to the word length from an MPEG-data hierarchical-structure decoding-circuit in accordance with the information for the word length of the output data, for example, n bits, and shifts the data temporarily stored by, for example, n bits. The head of the data temporarily stored in the shift circuit 58 due to the above shift serves as the head of the next encoded word, that is, the head of the encoded word B in FIG. 6.

Thus, a variable-length-data decoding circuit successively detects the encoded word of variable-length-encoded data and variable-length-decodes it.

However, a conventional variable-length-code decoder has disadvantages that it requires a plurality of variable-length-data decoding circuits and has a too large circuit, because it variable-length-decodes each of a plurality of variable-length-encoded MPEG picture data values for every data.

Therefore, the following apparatus is assumed as a variable-length-code decoder solving the disadvantage of a too large circuit.

The apparatus is provided with only one variable-length-data decoding circuit. That is, the apparatus is provided with the shift circuit 58 and the encoded word decoding circuit 59 one each.

The shift circuit 58 receives each of variable-length-encoded MPEG picture data values supplied from a first MPEG-data hierarchical-structure decoding circuit 6, a second MPEG-data hierarchical-structure decoding circuit 7, a third MPEG-data hierarchical-structure decoding circuit 8, . . . , and an nth MPEG-data hierarchical-structure decoding circuit 9 by means of time sharing. Moreover, the encoded word decoding circuit 59 variable-length-decodes and outputs the foremost encoded word in a data stream supplied from one of a plurality of MPEG-data hierarchical-structure decoding circuits through the above-described operation. Moreover, the shift circuit 58 shifts the stream of the output data by a value equivalent to the word length of the data output from the encoded word decoding circuit 59 as described above. In this case, no processing is applied to data streams other than the processed data stream. Thereafter, successively similarly, the encoded word decoding circuit 59 variable-length-decodes and outputs the foremost encoded word of a data stream supplied from other MPEG-data hierarchical-structure decoding circuit and the shift circuit 58 shifts the stream of output data by a value equivalent to the word length of the output data.

However, the above assumed variable-length-code decoder has a disadvantage that the variable-length decoding speed is too low though it conquers the disadvantage of a too large circuit. That is, the encoded word decoding circuit 59 has a disadvantage that it does not process the data supplied from other MPEG-data hierarchical-structure decoding circuits while it processes the data supplied from one MPEG-data hierarchical-structure decoding circuit.

It is an object of the third aspect of the present invention to provide a variable-length-code decoder having a small circuit and capable of performing variable-length decoding at a high speed by considering a problem of avoiding a too large circuit and a problem of improving the variable-length-decoding speed.

DISCLOSURE OF THE INVENTION

The first aspect of the present invention provides a picture processor comprising picture-deformation-information input means for inputting the information for the degree of enlargement or contraction of each portion of a picture; decoding means for inputting the picture data in which the picture is encoded and moreover inputting the information for the degree of enlargement or contraction of each portion of the picture from the picture-deformation-information input means, decoding the picture data for each portion of the picture in accordance with the information showing the degree of enlargement or contraction and moreover, decoding the entire picture data independently of the information showing the degree of enlargement or contraction; reference-picture generation means for generating a reference picture in which each portion of the picture is enlarged or contracted by using a picture in which the entire picture data supplied from the decoding means is decoded, the information showing the degree of enlargement or contraction of each portion of the picture supplied from the picture-deformation-information input means, and the movement vector of the picture data; and addition means for adding the picture in which each portion of the picture is decoded supplied from the decoding means and the reference picture supplied from the reference-picture generation means.

Moreover, the third aspect of the present invention provides a picture processor comprising picture-deformation-information input means for inputting the information showing the degree of enlargement or contraction of each portion of a picture and decoding means for inputting the picture data in which the picture is encoded and moreover inputting the information for the degree of enlargement or contraction of each portion of the picture from the picture-deformation-information input means and decoding the picture data for each portion of the picture in accordance with the information for the degree of enlargement or contraction.

The second aspect of the present invention provides a picture data processor comprising enlargement/contraction-information input means for inputting the degree of enlargement or contraction of a plurality of picture data values, picture processing means having a plurality of processing units for processing picture data to input a plurality of picture data values and process pictures, and assignment means for inputting the information for the degree of enlargement or contraction from the enlargement/contraction-information input means and assigning all or some of the processing-unit groups of the picture processing means to the enlargement or contraction processing of the picture data corresponding to the information for the degree of enlargement or contraction in accordance with the information for the degree of enlargement or contraction, wherein the picture processing means processes a plurality of picture data values in accordance with the information for the degree of enlargement or contraction and the assignment of the processing-unit groups.

The third aspect of the present invention provides a variable-length-code decoder comprising input means for successively continuously inputting variable-length-encoded MPEG picture data from a plurality of streams having the variable-length-encoded MPEG picture data by means of time sharing so that the data quantity supplied from each stream increases up to a predetermined quantity and variable-length decoding means for inputting the predetermined quantity of MPEG picture data from the input means, variable-length-decoding the data, outputting a predetermined decoded word to the outside of the variable-length-code decoder, and outputting the information for the length of the decoded word to be output to the input means, wherein the variable-length decoding means inputs the predetermined quantity of MPEG picture data from every stream other than the stream of the MPEG picture data for the decoded word to be output before outputting the predetermined decoded word to the outside of the variable-length-code decoder, and the input means inputs MPEG picture data from the stream of the MPEG picture data of the decoded word finally output to the outside of the variable-length-code decoder by the variable-length decoding means by using the information for the length of the output decoded word before the variable-length decoding means outputs the predetermined decoded word to the outside of the variable-length-code decoder and outputs a predetermined decoded word among the MPEG picture data of the stream next to the stream of the MPEG picture data of the output decoded word.

A high-speed shift circuit 200 serving as the input means of a variable-length-code decoder of the third aspect of the present invention is able to shift data at a high speed compared to the shift circuit 58 of the conventional variable-length-code decoder. Therefore, the variable-length decoding means of a variable-length-code decoder of the present invention is able to output a predetermined decoded word to the outside of the variable-length-code decoder and the input means is able to shift and input the MPEG picture data equivalent to the length of the encoded word before the decoded word is decoded from the stream of the output decoded word.

BRIEF DESCRIPTION OF THE DRAWINGS

FIGS. 3(a) and 3(b) are schematic diagrams showing the pictures in FIGS. 2(a) and 2(b) respectively divided into 25 blocks;

FIGS. 5(a) to 5(d) are illustrations for explaining decoding when the IDCT means of the picture processor of an embodiment according to the first aspect of the present invention decodes picture data;

FIGS. 7(a) and 7(b) are illustrations for explaining mapping when deforming a decoded picture and mapping it onto the wall of a room drawn through computer graphics on the display of a personal computer or the like;

FIGS. 14(a) and 14(b) are examples of displays of a personal computer used for an embodiment according to the second aspect of the present invention;

DESCRIPTION OF SYMBOLS

Figure 1:
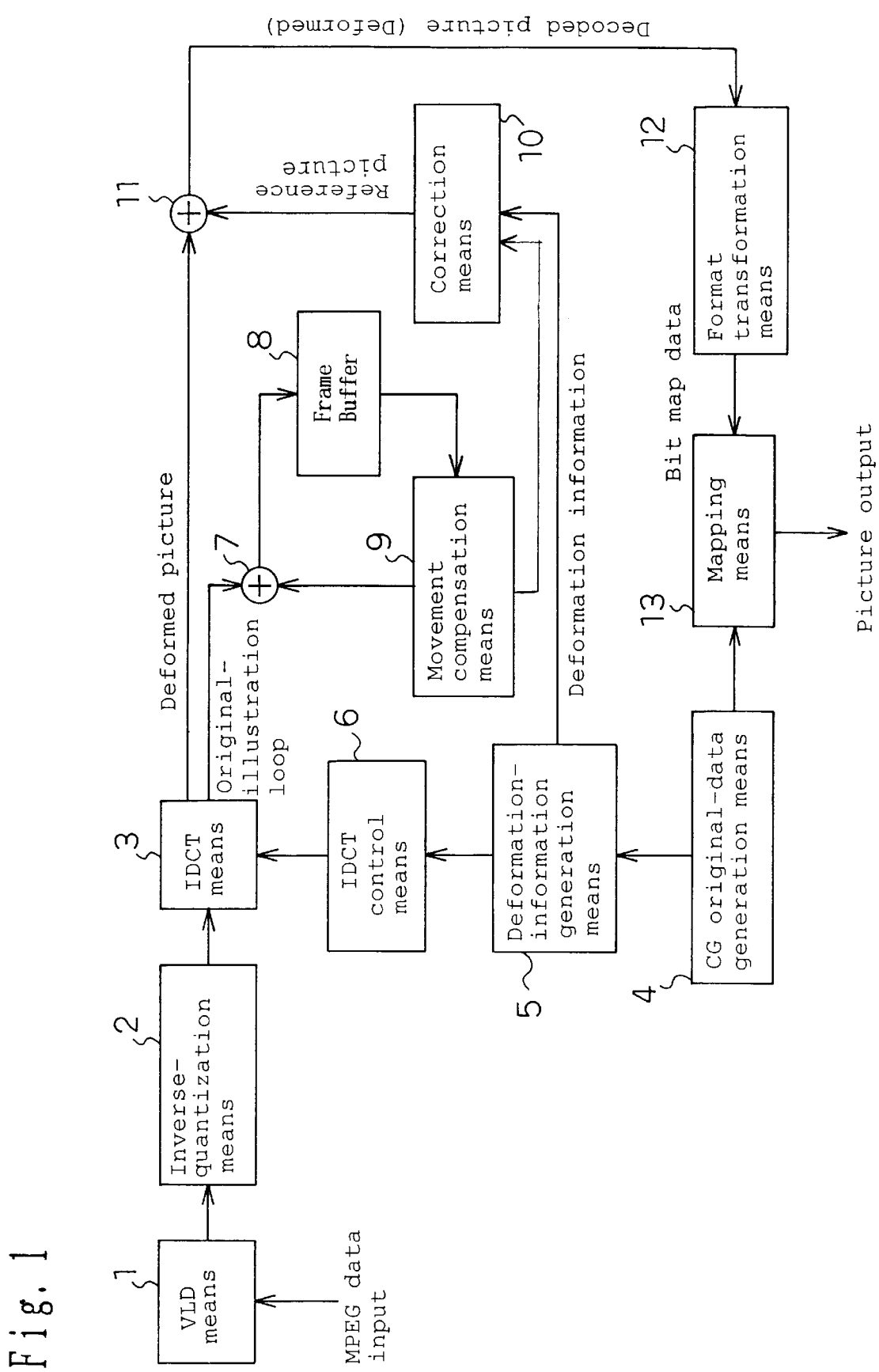
FIG. 1 is a block diagram of the picture processor of an embodiment 1 according to the first aspect of the present invention.

1 VLD means
2 Inverse-quantization means
3 IDCT means
4 CG original-data generation means
5 Deformation-information generation means
6 IDCT control means
7 First addition means, Addition means
8 Frame buffer
9 Movement compensation means
10 Correction means
11 Second addition means
12 Format transformation means
13 Mapping means
14 Deshuffling means
15 Picture
16 Display
17 Wall
18 Picture deformation means
1000 User I/F circuit
101 Shape computing circuit
102 Throughput control circuit
106 Picture-code generation source 1
107 Picture-code generation source 2
108 Picture-code generation source 3
109 Picture-code generation source n
110 Decoding and interpolating circuit
111 Memory I/F
112 Memory
201 Pasting-face size-and-shape determination circuit
202 Aspect-ratio computing circuit
302 Writing-position control circuit
303 Size-change control circuit
304 Picture-decoding control circuit
404 Throughput assignment circuit A
408 MPEG decoding-circuit group
412 Throughput assignment circuit B
416 Enlargement/contraction circuit group
501 Display
504, 505, 506, 507, 508, 509, 1201, 1202, 1203 Window
2500 External interface circuit
2501 Arithmetic unit 1
2502 Arithmetic unit 2
2503 Arithmetic unit 3
2504 Arithmetic unit 4
2505 Arithmetic unit 5
2506 Arithmetic unit n
2507 Variable coupling circuit
2508 Data temporary storage-circuit
2509 Coupling-system computing circuit
100 Data multiplexing circuit
200 High-speed shift circuit
300 Time-sharing variable-length-encoded word decoding circuit
400 Multiplexed-data separation circuit
500 High-speed clock circuit
600 First picture-code generation source
700 Second picture-code generation source
800 Third picture-code generation source
900 picture-code generation source
1099 First MPEG-data hierarchical-structure decoding circuit
1100 Second MPEG-data hierarchical-structure decoding circuit
1200 Third MPEG-data hierarchical-structure decoding circuit
1300 nth MPEG-data hierarchical-structure decoding circuit
1400 Information-source decoder group
1500 one-bit shift circuit
1600 First selection circuit
1700 Two-bit shift circuit
1800 Second selection circuit
1900 Four-bit shift circuit
2000 Third selection circuit
2100 Eight-bit shift circuit
2200 Fourth selection circuit
2300 Sixteen-bit shift circuit
2400 Fifth selection circuit
2500 Control circuit
2600 First decision circuit
2700 First register
2800 Second decision circuit
2900 Second register
3000 Third decision circuit
3100 Third register
3200 Polarity adjustment circuit
3300 Fourth register
3400 First flag memory
3500 Second flag memory
3600 Third flag memory
3700 Fourth flag memory
3800 Timing measurement circuit
3900 Reset-signal generation circuit
4000 Six-bit shift circuit
4100 Ten-bit shift circuit
4200 Twelve-bit shift circuit
4300 Fourteen-bit shift circuit
4400 Eighteen-bit shift circuit
4500 Twenty-bit shift circuit
4600 Twenty-two-bit shift circuit
4700 Twenty-four-bit shift circuit
4800 Twenty-six-bit shift circuit
4900 Twenty-eight-bit shift circuit
5000 Thirty-bit shift circuit
5100 Thirty-two-bit shift circuit
5200 Sixth selection circuit
5300 Seventh selection circuit
5400 First variable-length-data decoding circuit
5500 Second variable-length-data decoding circuit
5600 Third variable-length-data decoding circuit
5700 nth variable-length-data decoding circuit
5800 Shift circuit
5900 Encoded word decoding circuit

BEST MODE FOR CARRYING OUT THE INVENTION

Embodiments according to the first aspect of the present invention are described below by referring to the accompanying drawings.

Embodiment 1 According to First Aspect of the Present Invention

First, the configuration of the picture processor of the embodiment 1 according to the first aspect of the present invention is described below.

FIG. 1 shows the configuration of the picture processor of the embodiment 1 according to the first aspect of the present invention. The picture processor of the embodiment 1 according to the first aspect of the present invention is constituted of VLD means 1, inverse-quantization means 2, IDCT means 3, CG original-data generation means 4, deformation-information generation means 5, IDCT control means 6, first addition means 7, frame buffer 8, movement compensation means 9, correction means 10, second addition means 11, format transformation means 12, and mapping means 13.

The VLD means 1 is means for inputting and variable-length-decoding variable-length-encoded MPEG picture data.

The inverse-quantization means 2 is means for inputting variable-length-decoded MPEG picture data from the VLD means 1 and inversely quantizing the data.

The IDCT means 3 is means for inputting inversely-quantized MPEG picture data from the inverse-quantization means 2 and decoding MPEG picture data for each block to be mentioned later. The block is described later in detail.

The CG original-data generation means 4 is means for receiving a designation showing the position, shape, and size of an MPEG picture obtained from the MPEG picture data input by the VLD means 1 to be displayed on the display of a personal computer or the like from a user and outputting the information to the deformation-information generation means 5. The display displays an MPEG picture supplied from a picture processor.

The deformation-information generation means 5 is means for generating the information for the degree of enlargement or contraction of each of a plurality of blocks to be mentioned later in accordance with a designation for deformation of an MPEG picture supplied from the CG original-data generation means 4.

The IDCT control means 6 is means for controlling a decoding method for the IDCT means 3 to decode MPEG picture data for each block in accordance with the information for the degree of enlargement or contraction of each of a plurality of blocks supplied from the deformation-information generation means 5.

The first addition means 7 is means for adding a decoded difference picture supplied from the IDCT means 3 and a movement-compensated picture in which only a movement vector is compensated and which corresponds to the difference picture and is supplied from the movement compensation means 9 when the MPEG picture data input by the VLD means 1 is data for an inter-frame forward-estimation encoded picture (hereafter referred to as P-picture) or data for an inter-frame bidirectional-estimation encoded picture (hereafter referred to as B-picture).

The frame buffer 8 is means for temporarily storing the completely decoded picture of an I-picture decoded by the IDCT means 3, or P-picture or B-picture supplied from the first addition means 7.

The movement compensation means 9 is means for generating a movement-compensated picture in which only a movement vector is compensated from the completely-decoded picture of an I-picture and/or P-picture stored in the frame buffer 8 by using only the movement vector of the MPEG picture data input to the VLD means 1 when the data shows a P-picture or B-picture.

Moreover, when the MPEG picture data input by the VLD means 1 is the data for a P-picture, the frame buffer 8 should have already stored at least an I-picture from the IDCT means 3. Similarly, when the MPEG picture data input by the VLD means 1 is the data for a B-picture, the frame buffer 8 should have already stored the completely-decoded pictures of an I-picture and a P-picture. This is because the data for a P-picture or B-picture is constituted of only difference data and movement-vector data and therefore, a picture serving as a reference for them is necessary in order to generate a complete picture.

The correction means 10 is means for generating a reference picture by interpolating and thinning the pixels of a movement-compensated picture supplied from the movement compensation means 9 in accordance with the deformation information supplied from the deformation-information generation means 5 and thereby deforming the movement-compensated picture when the MPEG picture data input by the VLD means 1 is the data for a P-picture or a B-picture.

The second addition means 11 is means for adding a decoded difference picture supplied from the IDCT means 3 and a reference picture corresponding to the difference picture and supplied from the correction means 10, which are generated in accordance with the deformation information from the deformation-information generation means 5, when the MPEG picture data input by the VLD means 1 is the data for a P-picture or B-picture. Moreover, when the MPEG picture data input by the VLD means 1 shows an I-picture, the second addition means 11 passes an I-picture decoded in accordance with the deformation information supplied from the IDCT means 3.

The format transformation means 12 is means for transforming a picture according to the YUV format into a picture according to the RGB format because the completely-decoded picture of the I-picture supplied from the IDCT means 3 and passing through the second addition means 11 or the P-picture or B-picture supplied from the second addition means 11 is a picture according to the YUV format.

The mapping means 13 is means for displaying a picture supplied from the format transformation means 12 on the display of a personal computer or the like in accordance with the designation for a mapping position supplied from the CG original-data generation means 4.

Then, operations of the picture processor of the embodiment 1 according to the first aspect of the present invention is described below.

Because operations of the picture processor differ when the MPEG picture data input by the VLD means 1 is data for an I-picture from those of the picture processor, when the MPEG picture data is data for a P-picture or B-picture, these two types of operations are separately described below.

First, operations of the picture processor when the MPEG picture data input by the VLD means 1 is data for an I-picture are described.

Initially, to display an MPEG picture shown in FIG. 2(a) obtained from the MPEG picture data input by the VLD means 1 on the display of a personal computer or the like by deforming the MPEG picture as shown in FIG. 2(b), the CG original-data generation means 4 receives a designation showing how to deform the MPEG picture from a user and outputs the information showing how to deform the MPEG picture to the deformation-information generation means 5. In this case, it is assumed that FIG. 2(a) shows a picture obtained by decoding, every DCT coefficient of the MPEG picture data input to the VLD means 1 when the data is data for an in-frame encoded picture (hereafter referred to as I-picture). However, it is assumed that FIG. 2(b) shows a picture obtained by deforming the picture in FIG. 2(a).

Figure 2:
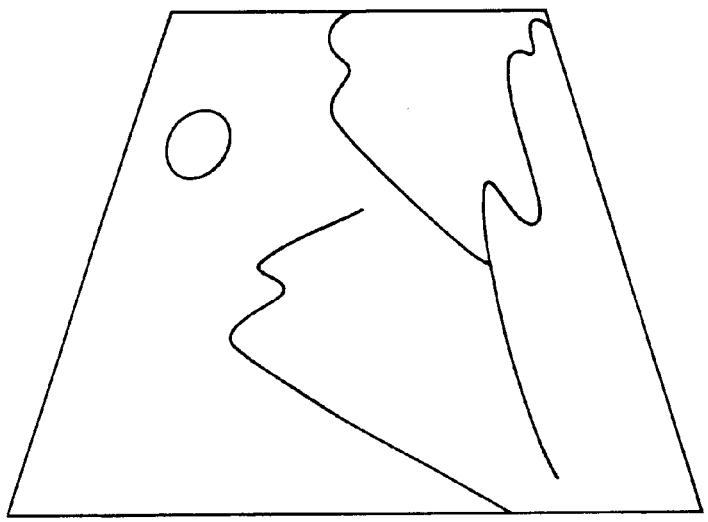
FIGS. 2(a) and 2(b) are illustrations for explaining picture deformation when the picture processor of an embodiment according to the first aspect of the present invention deforms a picture.
Figure 2:
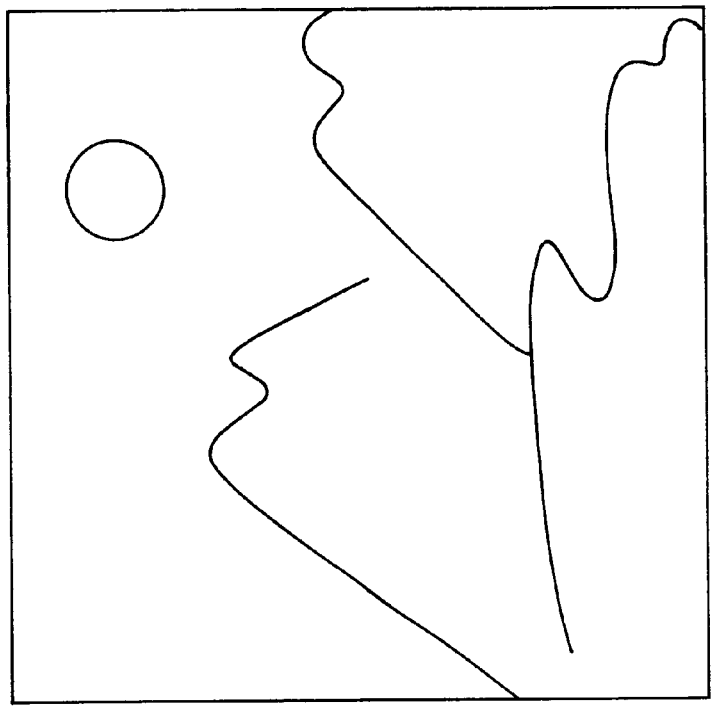
Figures 3, 4:
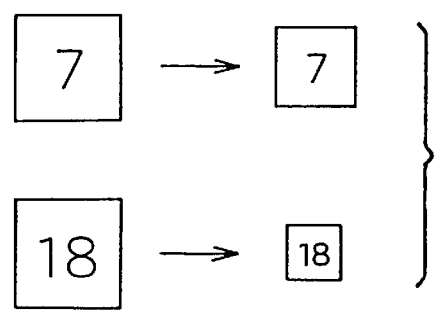
FIG. 4 is an illustration obtained by merely contracting the blocks in FIGS. 3(a) and 3(b)

Moreover, the deformation-information generation means 5 generates the information for the degree of enlargement or contraction of each of a plurality of blocks of FIG. 3(a) corresponding to FIG. 2(a) so as to generate the picture in FIG. 2(b) from the picture in FIG. 2(a) in accordance with a designation for deformation of an MPEG picture supplied from the CG original-data generation means 4. FIG. 3(a) is a schematic diagram obtained by dividing the picture in FIG. 2(a) into 25 blocks and each block is a partial picture constituting the diagram in FIG. 3(a). Similarly, FIG. 3(b) shows a schematic diagram obtained by dividing the picture in FIG. 2(b) into 25 blocks. The number attached to each block in FIGS. 3(a) and 3(b) is used to distinguish between blocks and it is assumed that blocks having the same number in FIGS. 3(a) and 3(b) correspond to each other. For example, the seventh block in FIG. 3(a) corresponds to the seventh block in FIG. 3(b). Moreover, it is assumed that the picture in FIG. 2(a) is deformed to generate the picture in FIG. 2(b) by enlarging or contracting each block in FIG. 3(a) when generating the picture in FIG. 2(b) from the picture in FIG. 2(a). That is, it is assumed that each block in FIG. 3(b) is a block obtained by enlarging or contracting a corresponding block in FIG. 3(a) or an equivalent block. In this case, the deformation-information generation means 5 generates the information for the degree of enlargement or contraction of each block so that the size of each block in FIG. 3(b) becomes equal to that of a corresponding block in FIG. 3(a) as for the first to fifth blocks, the length and width of a corresponding block in FIG. 3(a) are contracted to ¾ as for the sixth to fifteenth blocks, and the length and width of a corresponding block in FIG. 3(a) are contracted to ½ as for the sixteenth to twenty-fifth blocks. Moreover, when merely contracting each block in FIG. 3(a), the seventh block or eighteenth block, for example, is contracted only in size as shown in FIG. 4 and thereby, shape of the seventh or eighteenth block does not fit the shape of the seventh or eighteenth block in FIG. 3(b). In this case, however, it is assumed that each block in FIG. 3(a) is merely enlarged or contracted and thereby, each block is approximated to a corresponding block in FIG. 3(b).

Thereafter, the IDCT control means 6 controls the decoding method for the IDCT means 3 to decode MPEG picture data for each block in accordance with the information for the degree of enlargement or contraction of each of a plurality of blocks supplied from the deformation-information generation means 5.

Moreover, the VLD means 1 inputs and variable-length-decodes variable-length-encoded MPEG picture data and the inverse-quantization means 2 inversely quantizes the variable-length-decoded MPEG picture data.

Furthermore, the IDCT means 3 decodes the inversely-quantized MPEG picture data supplied from the inverse-quantization means 2 in accordance with the control of the decoding method supplied from the IDCT control means 6 every block of the MPEG picture. It is assumed that the block, that is, each block in FIG. 3(a) is a partial picture in which 8×8 DCT coefficients are all decoded. Therefore, the IDCT means 3 decodes all the 8×8 DCT coefficients as for the first to fifth blocks of FIG. 3(a) as shown in FIG. 5(a), decodes low-frequency-side 6×6 DCT coefficients among the 8×8 DCT coefficients as for the sixth to fifteenth blocks as shown in FIG. 5(b), and decodes low-frequency-side 4×4 DCT coefficients among the 8×8 DCT coefficients as for the sixteenth to twenty-fifth blocks as shown in FIG. 5(c). Thereafter, the IDCT means 3 outputs the decoded picture, that is, the picture in FIG. 2(b) to the format transformation means 12 through the second addition means 11.

Moreover, the IDCT means 3 decodes all the 8×8 DCT coefficients for every block of the MPEG picture obtained from the inversely-quantized MPEG picture data supplied from the inverse-quantization means 2 independently of the control of the decoding method supplied from the IDCT control means 6 and outputs the decoded picture, that is, the picture in FIG. 2(a) to the frame buffer 8. Moreover, the frame buffer 8 temporarily stores the picture in FIG. 2(a). This is because the temporary storage of the picture in FIG. 2(a) is necessary when the MPEG picture data input by the VLD means 1 shows a P-picture or B-picture.

Then, the format transformation means 12 transforms the format of a picture passing through the second addition means 11 and supplied from the IDCT means 3 from YUV to RGB.

Finally, the mapping means 13 displays a picture supplied from the format transformation means 12 on the display of a personal computer or the like in accordance with the designation for mapping position supplied from the CG original-data generation means 4.

Then, operations of the picture processor when the MPEG picture data input by the VLD means 1 is data for a P-picture or B-picture are described below.

When the MPEG picture data input by the VLD means 1 is data for a P-picture, the frame buffer 8 should have already stored at least an I-picture. Moreover, when the MPEG picture data input by the VLD means 1 is data for a B-picture, the frame buffer 8 should have already stored completely-decoded pictures of I-picture and P-picture. This is because the data for a P-picture or B-picture includes only difference data and movement-vector data and thereby, a picture serving as a reference for them is necessary in order to generate a complete picture.

Moreover, as described above, the CG original-data generation means 4 receives a designation showing how to deform an MPEG picture obtained from the MPEG picture data input by the VLD means 1 when displaying the MPEG picture on the display of a personal computer or the like from a user and outputs the information showing how to deform the MPEG picture to the deformation-information generation means 5.

Moreover, the deformation-information generation means 5 generates the information for the degree of enlargement or contraction of each of a plurality of blocks obtained by dividing the MPEG picture shown in FIG. 3(a) in accordance with the designation for deformation of an MPEG picture supplied from the CG original-data generation means 4. In this case, the deformation-information generation means 5 generates the information for the degree of enlargement or contraction of each block so that the size of each block in FIG. 3(b) becomes equal to that of a corresponding block in FIG. 3(a) as for the first to fifth blocks, the length and width of a corresponding block in FIG. 3(a) are contracted to ¾ as for the sixth to tenth blocks, and the length and width of a corresponding block in FIG. 3(a) are contracted to ½ as for the eleventh to twentieth blocks, and the length and width of a corresponding block in FIG. 3(a) are contracted to ¼ as for the twenty-first to twenty-fifth blocks.

Thereafter, the IDCT control means 6 controls a decoding method for the IDCT means 3 to decode MPEG picture data every block in accordance with the information for the degree of enlargement or contraction of each of a plurality of blocks supplied from the deformation-information generation means 5.

Moreover, the VLD means 1 inputs and variable-length-decodes variable-length-encoded MPEG picture data and the inverse-quantization means 2 inversely quantizes the variable-length-decoded MPEG picture data.

Then, the IDCT means 3 decodes only the difference data of the inversely-quantized MPEG picture data supplied from the inverse-quantization means 2 in accordance with the control of the decoding method supplied from the IDCT control means 6 for each block of the MPEG picture. That is, the IDCT means 3 decodes all 8×8 DCT coefficients as for the first to fifth blocks of the MPEG picture shown in FIG. 3(*a*) as shown in FIG. 5(*a*), decodes low-frequency-side 6×6 DCT coefficients as for the sixth to tenth blocks as shown in FIG. 5(*b*), decodes low-frequency-side 4×4 DCT coefficients as for the eleventh to twentieth blocks as shown in FIG. 5(*c*), and decodes low-frequency-side 2×2 DCT coefficients as for the twenty-first to twenty-fifth blocks as shown in FIG. 5(*d*). Thereafter, the IDCT means 3 outputs a difference picture obtained by decoding only difference data to the second addition means 11 in accordance with the control of the decoding method supplied from the IDCT control means 6.

Moreover, the IDCT means 3 decodes all the 8×8 DCT coefficients of only the difference data of the inversely-quantized MPEG picture data supplied from the inverse-quantization means 2 for every block and outputs the decoded difference picture to the first addition means 7. The size of the difference picture is equal to the size of the picture in FIG. 2(*a*).

Then, the movement compensation means 9 inputs a movement vector input by the VLD means 1 and a complete picture serving as a reference of the movement vector, for example, an I-picture from the frame buffer 8 and generates a movement-compensated picture in which only the movement vector is compensated. The movement-compensated picture is a picture having a size equal to that of a picture in which every 8×8 DCT coefficient of the data for the I-picture is decoded for any block. That is, the size of the movement-compensated picture is equal to that of the picture in FIG. 2(*a*). Moreover, the movement compensation means 9 outputs a movement-compensated picture to the correction means 10 and moreover outputs it to the first addition means 7.

The first addition means 7 adds a difference picture in which:all 8×8 DCT coefficients are decoded for any block supplied from the IDCT means 3 and a movement-compensated picture corresponding to the difference picture and supplied from the movement compensation means 9 and outputs the added picture to the frame buffer 8 and the frame buffer 8 temporarily stores the picture obtained by adding the difference picture and movement-compensated picture and supplied from the first addition means 7 as the complete picture of a P-picture or B-picture.

Moreover, the correction means 10 inputs a movement-compensated picture from the movement compensation means 9 and moreover, inputs the information for the degree of enlargement or contraction of each of 25 blocks of the movement-compensated picture supplied from the deformation-information generation means 5 in FIG. 3(*a*) when each of the 25 blocks is enlarged or contracted to a corresponding block in FIG. 3(*b*). Moreover, the correction means 10 interpolates and thins pixels of the movement-compensated picture in accordance with the information for the degree of enlargement or contraction of each of the 25 blocks and thereby deforms the movement-compensated picture to generate a reference picture. That is, the correction means 10 interpolates and thins pixels of each block of a movement-compensated picture corresponding to a difference picture obtained when the IDCT means 3 decodes only difference data in accordance with the control of the decoding method supplied from the IDCT control means 6 so that the size of each block of the movement-compensated picture becomes equal to that of each block of the difference picture and thereby, enlarges or contracts each block of the movement-compensated picture. For example, when the IDCT means 3 decodes low-frequency-side 6×6 DCT coefficients of the seventh block, the correction means 10 thins pixels of the seventh block of a movement-compensated picture so that the size of the seventh block becomes equal to the size of a partial picture in which the 6×6 DCT coefficients are decoded. Thereafter, the correction means 10 outputs a reference picture to the second addition means 11.

Then, the second addition means 11 adds a difference picture in which only difference data is decoded in accordance with the control of the decoding method of the IDCT control means 6 and which is supplied from the IDCT means 3 and a reference picture corresponding to the difference picture and supplied from the correction means 10, and then outputs, the added picture to the format transformation means 12.

Then, the format transformation means 12 transforms the format of a picture supplied from the second addition means 11 from YUV to RGB.

Finally, the mapping means 13 displays a picture supplied from the format transformation means 12 on the display of a personal computer or the like in accordance with the designation for mapping position supplied from the CG original-data generation means 4.

Embodiment 2 According to First Aspect of the Present Invention

First, the configuration of the picture processor of the embodiment 2 according to the first aspect of the present invention is described below.

Figure 6:
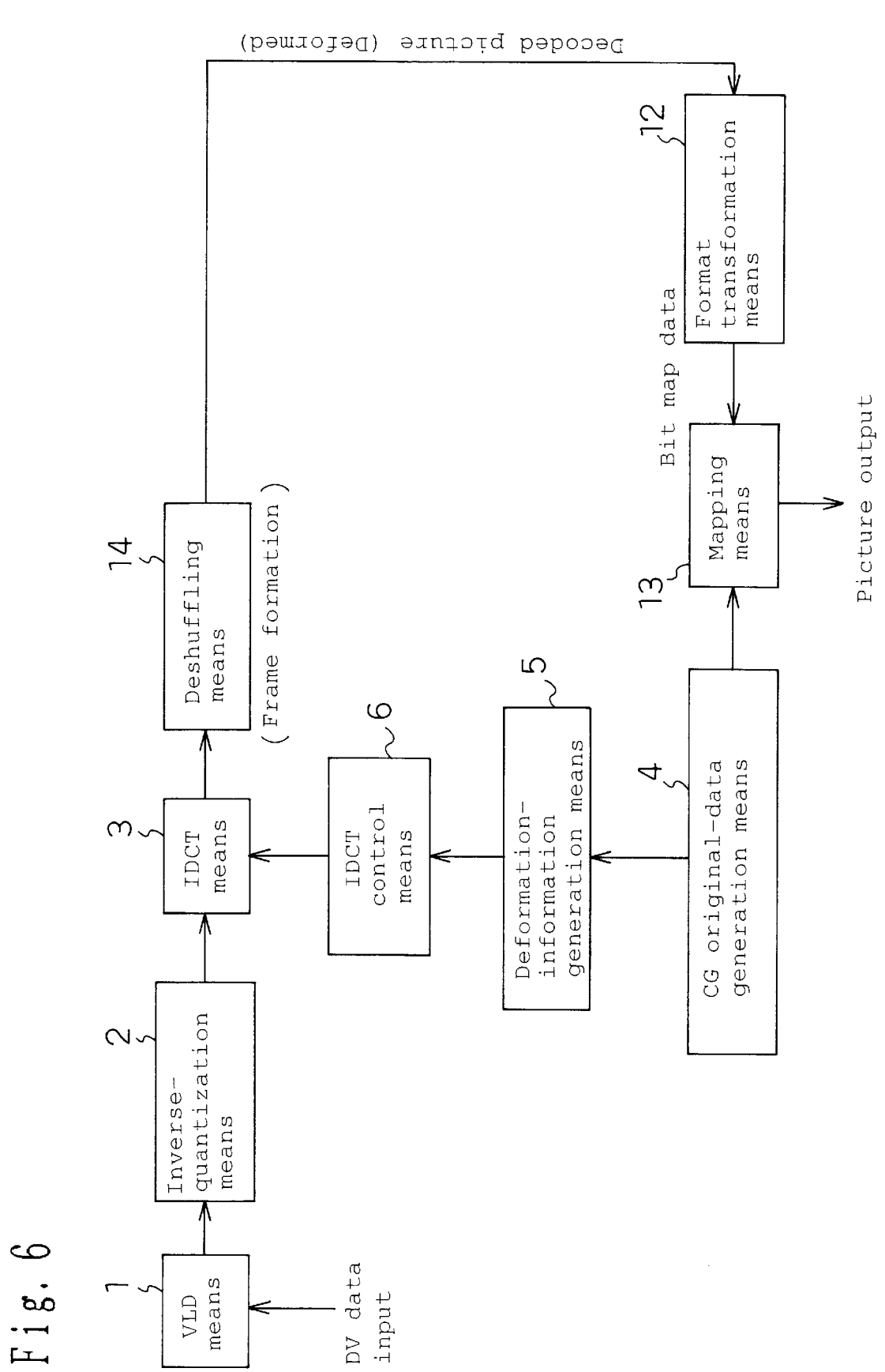
FIG. 6 is a block diagram of the picture processor of an embodiment 2 according to the first aspect of the present invention.
Figure 7A:
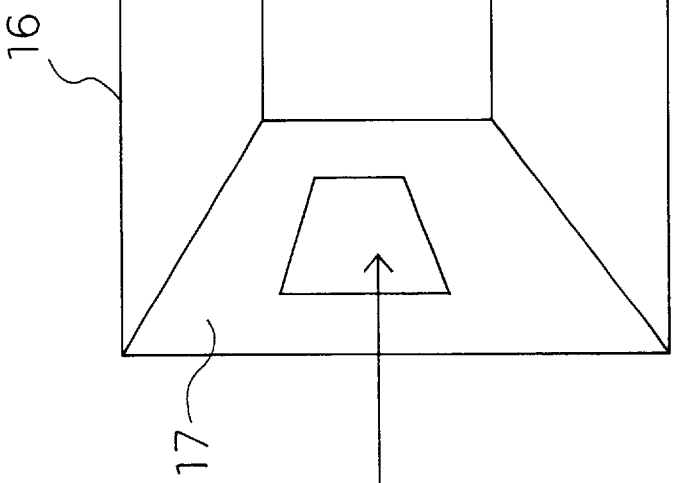
Figure 7B:
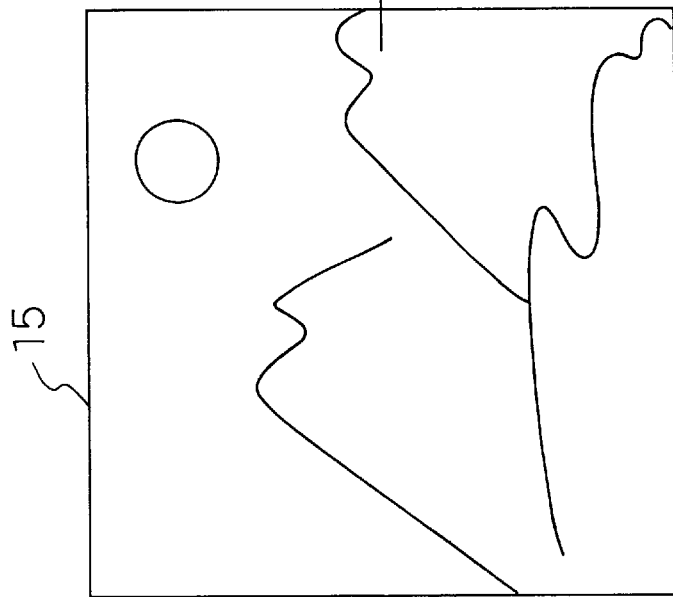
Figure 8:
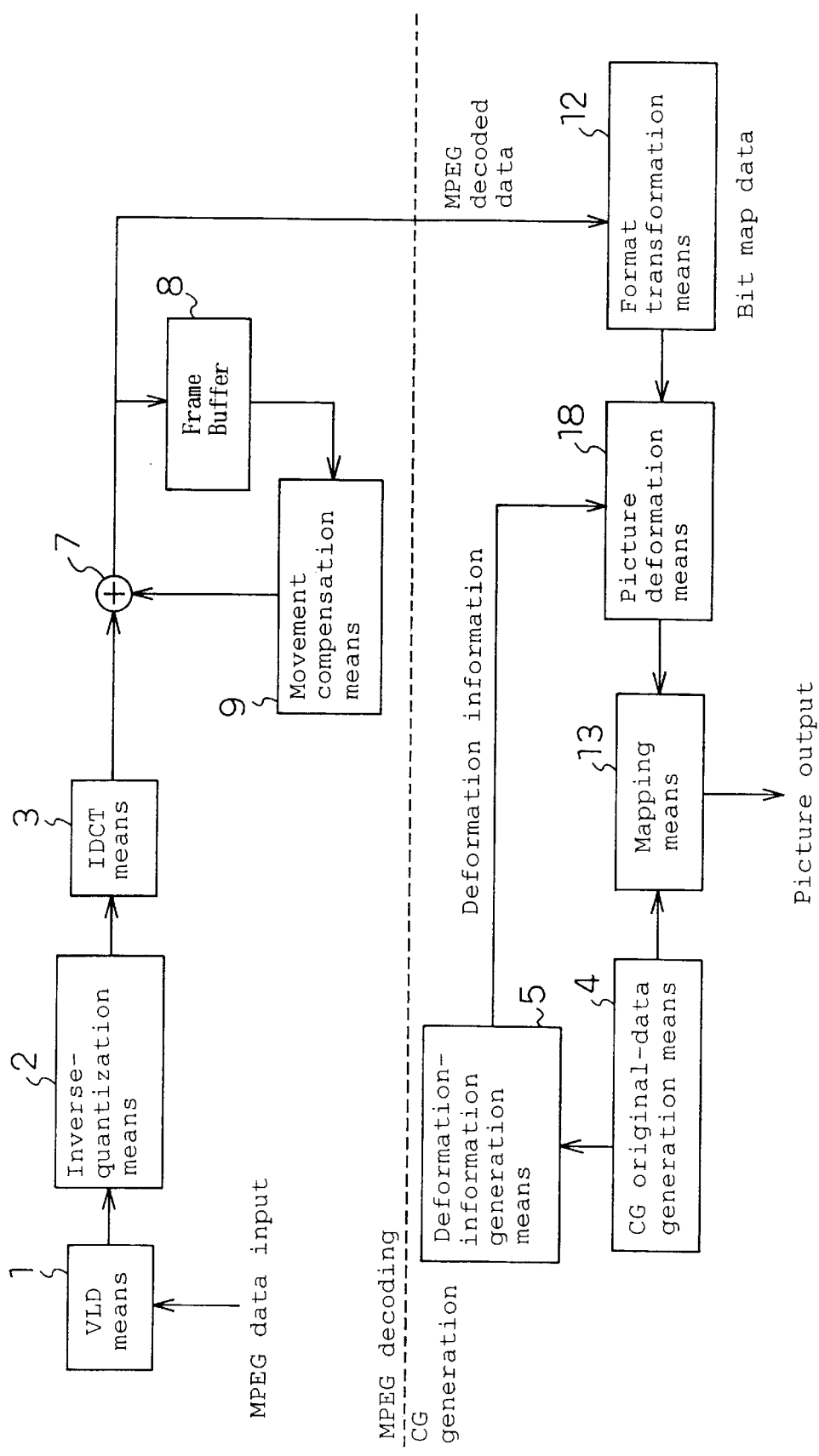
FIG. 8 is a block diagram of a conventional MPEG-picture mapping apparatus.
Figure 9:
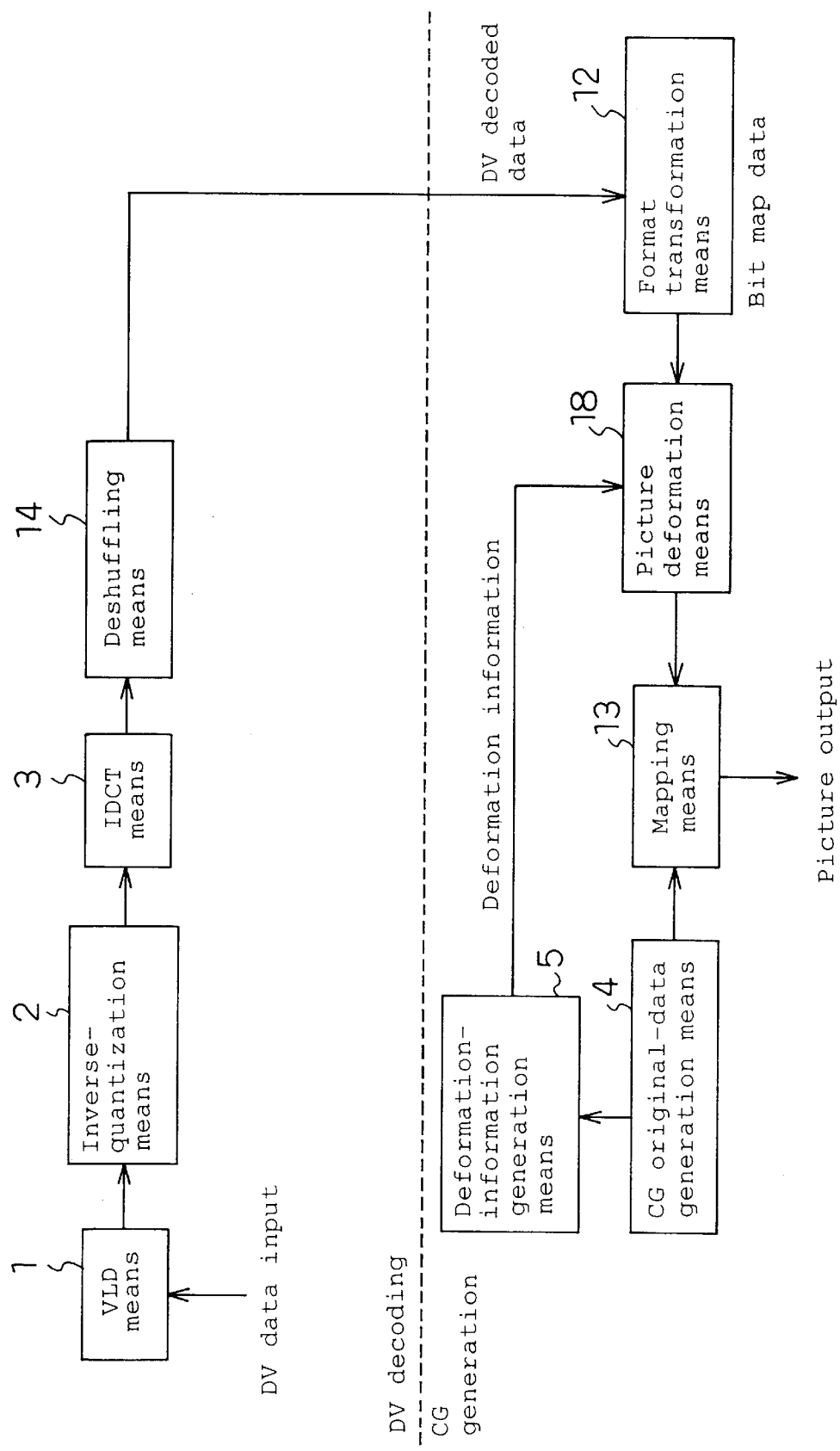
FIG. 9 is a block diagram of a conventional DV-picture mapping apparatus.

FIG. 6 shows a block diagram of the picture processor of the embodiment 2 according to the first aspect of the present invention. The picture processor of the embodiment 2 according to the first aspect of the present invention is provided with the configuration means same as the configuration means provided for the picture processor of the embodiment 1. That is, the picture processor of the embodiment 2 is constituted of VLD means 1, inverse-quantization means 2, IDCT means 3, CG original-data generation means 4, deformation-information generation means 5, IDCT control means 6, deshuffling means 14, format transformation means 12, and mapping means 13.

The VLD means 1 is means for inputting and variable-length-decoding variable-length-encoded DV picture data.

The inverse-quantization means 2 is means for inputting variable-length-decoded DV picture-data from the VLD means 1 and inversely quantizing the data.

The IDCT means 3 is means for inputting inversely-quantized DV picture data from the inverse-quantization means 2 and decoding the DV picture data every block shown in FIG. 3 used for the embodiment 1.

The CG original-data generation means 4 is means for receiving a designation showing where and at what shape and size to display a DV picture data decoded from the DV picture data input to the VLD means 1 on the display of a personal computer or the like from a user and outputting the information for the designation to the deformation-information generation means 5. The display displays a DV picture supplied from a picture processor.

The deformation-information generation means 5 is means for generating the information for the degree of enlargement or contraction of each of a plurality of blocks shown in FIG. 3 used for the embodiment 1 in accordance with the designation for deformation of a DV picture supplied from the CG original-data generation means 4.

The-IDCT control means 6 is means for controlling a decoding method when the IDCT means 3 decodes DV picture data for each block in accordance with the information for the degree of enlargement or contraction of each of a plurality of blocks supplied from the deformation-information generation means 5.

The deshuffling means 14 is means for correctly arranging a decoded partial picture for each block supplied from the IDCT means 3 and completing the picture of a frame every frame.

The format transformation means 12 is means for transforming the format of a picture supplied from the deshuffling means 14 from a YUV format into an RGB format.

The mapping means 13 is means for displaying a picture supplied from the format transformation means 12 on the display of a personal computer or the like in accordance with the designation for mapping position supplied from the CG original-data generation means 4.

Then, operations of the picture processor of the embodiment 1 according to the second aspect of the present invention are described below.

First, the CG original-data generation means 4 receives a designation from a user showing how to deform the DV picture from the DV picture data input by the VLD means 1 shown in FIG. 2(*a*) when deforming the DV picture as shown in FIG. 2(*b*) and displaying it on the display of a personal computer or the like, and outputting the information for the designation to the deformation-information generation means 5. As for the embodiment 2, it is assumed that FIG. 2(*a*) illustrates a picture when all DCT coefficients of DV picture data are decoded and FIG. 2(*b*) illustrates a picture obtained by deforming the picture in FIG. 2(*a*).

Moreover, the deformation-information generation means 5 generates the information for the degree of enlargement or contraction of each of a plurality of blocks in FIG. 3(*a*) corresponding to FIG. 2(*a*) so as to generate the picture of FIG. 2(*b*) from the picture in FIG. 2(*a*) in accordance with the designation for deformation of a DV picture supplied from the CG original-data generation means 4. Also as for the embodiment 2, it is assumed that FIG. 3(*a*),shows a schematic diagram obtained by dividing the picture in FIG. 2(*a*) into 25 blocks and each block is a partial picture constituting the picture in FIG. 3(*a*). Similarly, it is assumed that FIG. 3(*b*) shows a schematic diagram obtained by dividing the picture in FIG. 2(*b*) into 25 blocks. Moreover, it is assumed that a number attached to each block in FIGS. 3(*a*) and 3(*b*) is a number for distinguishing between blocks and blocks in FIGS. 3(*a*) and 3(*b*) having the same number correspond to each other. Moreover, it is assumed that the picture in FIG. 2(*b*) is generated from the picture in FIG. 2(*a*) by enlarging or contracting each block in FIG. 3(*a*) and deforming the picture in FIG. 2(*a*). That is, it is assumed that each block in FIG. 3(*b*) is a block obtained by enlarging or contracting a corresponding block in FIG. 3(*a*) or a block equivalent to a block in FIG. 3(*a*). In this case, the deformation-information generation means 5 generates the information for the degree of enlargement or contraction of each block in FIG. 3(*b*) so that the size of each block in FIG. 3(*b*) becomes equal to that of a corresponding block in FIG. 3(*a*) as for the first to fifth blocks, the length and width of a corresponding block in FIG. 3(*a*) are contracted to ¾ as for the sixth to fifteenth blocks, and the length and width of a corresponding block in FIG. 3(*a*) are contracted to ½ as for the sixteenth to twenty-fifth blocks. When merely contracting each block in FIG. 3(*a*), the seventh or eighteenth block, for example, is contracted only in size as shown in FIG. 4 but the shape of each block does not fit the shape of the seventh or eighteenth block in FIG. 3(*b*). In this case, however, it is assumed that each block in FIG. 3(*a*) is approximated to a corresponding block in FIG. 3(*b*) by merely enlarging or contracting each block in FIG. 3(*a*).

Thereafter, the IDCT control means 6 controls the decoding method when the IDCT means 3 decodes DV picture data every block in accordance with the information for the degree of enlargement or contraction of each of a plurality of blocks supplied from the deformation-information generation means 5.

Moreover, the VLD means 1 inputs and variable-length-decodes variable-length-encoded DV picture data and the inverse-quantization means 2 inversely quantizes the variable-length-decoded DV picture data.

Furthermore, in accordance of the control of the decoding method from the IDCT control means 6, the IDCT means 3 decodes the inversely-quantized DV picture data, supplied from the inverse-quantization means 2 every DV picture of the DV picture data, that is, every block of the schematic diagram in FIG. 3(*a*) and successively outputs decoded DV picture data to the deshuffling means 14. As for the embodiment 2, it is assumed that the IDCT means 3 decodes the blocks in FIG. 3(*a*) in order of first→third→fifth→seventh→ . . . →twenty-first →twenty-third→twenty-fifth→second→fourth→ sixth→eighth→ . . . →twentieth→twenty-second→ twenty-fourth blocks. Moreover, it is assumed that each block in FIG. 3(*a*) is a partial picture in which every 8×8 DCT coefficient is decoded. The decoding method is shown below. That is, the IDCT means 3 decodes every 8×8 DCT coefficient as for the first to fifth blocks in FIG. 3(*a*) as shown in FIG. 5(*a*), decodes low-frequency-side 6×6 DCT coefficients among the 8×8 DCT coefficients as for the sixth to fifteenth blocks as shown in FIG. 5(*b*), and decodes low-frequency-side 4×4 DCT coefficients among the 8×8 DCT coefficients as for the sixteenth to twenty-fifth blocks as shown in FIG. 5(*c*).

Thereafter, the deshuffling means 14 correctly arranges the partial picture of each block in FIG. 3(*a*) decoded every block supplied from the IDCT means 3 to the position of a block in FIG. 3(*b*) whose number corresponds to a block in FIG. 3(*a*) and completes a picture. For example, the partial picture of the thirteenth block in FIG. 3(*a*) is arranged to the position of the thirteenth block in FIG. 3(*b*) and the partial picture of the twenty-first block in FIG. 3(*a*) is arranged to the position of the twenty-first block in FIG. 3(*b*). Moreover, the deshuffling means 14 outputs the completed picture to the format transformation means 12.

Then, the format transformation means 12 transforms the picture supplied from the deshuffling means 14 from YUV to RGB.

Finally, the mapping means 13 displays a picture supplied from the format transformation means 12 on the display of a personal computer or the like in accordance with the designation for mapping position supplied from the CG original-data generation means 4.

As for the embodiment 2, the order for the IDCT means 3 to decode each block in FIG. 3(a) is assumed as the order of first→third→fifth→seventh→ . . . →twenty-first→twenty-third→twenty-fifth→second→fourth→sixth→eighth→ . . . →twentieth→twenty-second→twenty-fourth blocks. However, the order is not restricted to the above order. In short, the IDCT means 3 of the embodiment 2 does not decode each block in order of numbers attached to blocks in FIG. 3(a).

As for the first aspect of the present invention, the CG original-data generation means 4, deformation-information generation means 5, and IDCT control means 6 are used as picture-deformation-information input means. The VLD means 1, inverse-quantization means 2, and IDCT means 3 are used as decoding means. Moreover, the first addition means 7, frame buffer 8, movement compensation means 9, and correction means 10 are used as reference-picture generation means. Furthermore, the second addition means 11 is used as addition means and the deshuffling means 14 is used as rearrangement means. However, picture-deformation-information input means according to the first aspect of the present invention is not restricted to the above CG original-data generation means 4, deformation-information generation means 5, and IDCT control means 6. In a word, any means can be used as long as the means inputs the information for the degree of enlargement or contraction of each portion of a picture. Moreover, decoding means according to the first aspect of the present invention is not restricted to the VLD means 1, inverse-quantization means 2, and IDCT means 3. In a word, any means can be used as long as the means inputs encoded picture data and moreover inputs the information for the degree of enlargement or contraction of each portion of a picture from picture-deformation-information input means, decodes the picture data in accordance with the information for the degree of enlargement or contraction every portion of the picture, and decodes the entire picture data independently of the information for the degree of enlargement or contraction. Moreover, any means can be used as decoding means according to the first aspect of the present invention as long as the means inputs encoded picture data and moreover inputs the information for the degree of enlargement or contract ion of each portion of a picture supplied from picture-deformation-information input means, and decodes the picture data every portion of the picture in accordance with the information for the degree of enlargement or contraction. Furthermore, reference-picture generation means according to the first aspect of the present invention is not restricted to the first addition means 7, frame buffer 8, movement compensation means 9, and correction means 10. In a word, any means can be used as long as the means generates a reference picture each of whose portions is enlarged or contracted by using a picture which is supplied from decoding means and in which the entire picture data is decoded and the information for the degree of enlargement or contraction of each portion of a picture supplied from picture-deformation-information input means and the movement vector of the picture data.

Moreover, though it is assumed that FIGS. 3(a) and 3(b) respectively show a schematic diagram obtained by dividing the picture in FIGS. 2(a) or 2(b) into 25 blocks. However, the number of blocks when the picture in FIGS. 3(a) or 3(b) is divided into blocks is not restricted to 25. That is, it is possible to unite the first to fifth blocks in FIG. 3(a) into one block. In short, the picture in FIG. 3(a) can use any picture as long as the picture is divided into blocks every portions having the same degree of enlargement or contraction of the picture when the picture in FIG. 3(a) is deformed into the picture in FIG. 3(b). Moreover, the picture in FIG. 3(b) can use any picture as long as the picture is divided into blocks every portions having the same degree of enlargement or contraction of the picture so as to correspond to the block division in FIG. 3(a).

Furthermore, when the picture in FIG. 2(a) is deformed to the picture in FIG. 2(b), a case is shown in which each block in FIG. 3(a) is decoded so as to have an equal size or so as to be contracted. However, it is possible that each block in FIG. 3(a) is enlarged correspondingly to the degree of deformation of a picture. The enlargement is performed by adding data of 0 value to the high-frequency component of nine-order or higher of, for example, 8×8 DCT coefficients and generating and decoding 10×10 DCT coefficients.

Furthermore, when a picture is contracted, the entire picture may be contracted so that some blocks in FIG. 3(a) are not present in FIG. 3(b) correspondingly to the degree of contraction of the picture. That is, there is a case in which the contraction ratio of a block is equal to 100%. In this case, because the difference between the block to be absent and the next block is necessary when generating a picture, only the DC component of 8×8 DCT coefficients is decoded.

Furthermore, as for the above embodiments, the format of a picture supplied from the IDCT means 3, second addition means 11, or deshuffling means 14 is transformed by the format transformation means 12. However, it is not always necessary to transform the format. In a word, to display a picture supplied from a picture processor according to the first aspect of the present invention on the display of a personal computer or the like, it is only necessary that the format of the picture fits the display. Therefore, when the format of a picture is not transformed by the format transformation means 12, the mapping means 13 displays a picture supplied from the IDCT means 3, second addition means 11, or deshuffling means 14 on a display.

Furthermore, for the above embodiments, a case is described in which one picture is displayed on the display of a personal computer or the like. However, to display a plurality of pictures on a display, it is only necessary to divide each of the pictures into blocks, enlarge or contract each of them every block when decoding picture data, and deform the pictures.

As described above, the first aspect of the present invention makes it possible to provide a picture processor for deforming a picture in accordance with the information for the degree of enlargement or contraction of each portion of the picture when decoding encoded picture data.

Then, embodiments according to the second aspect of the present invention are described below by referring to the accompanying drawings.

Embodiment 1 According to Second Aspect of the Present Invention

First, the configuration of the picture data processor of the embodiment 1 according to the second aspect of the present invention is described below.

Figure 10:
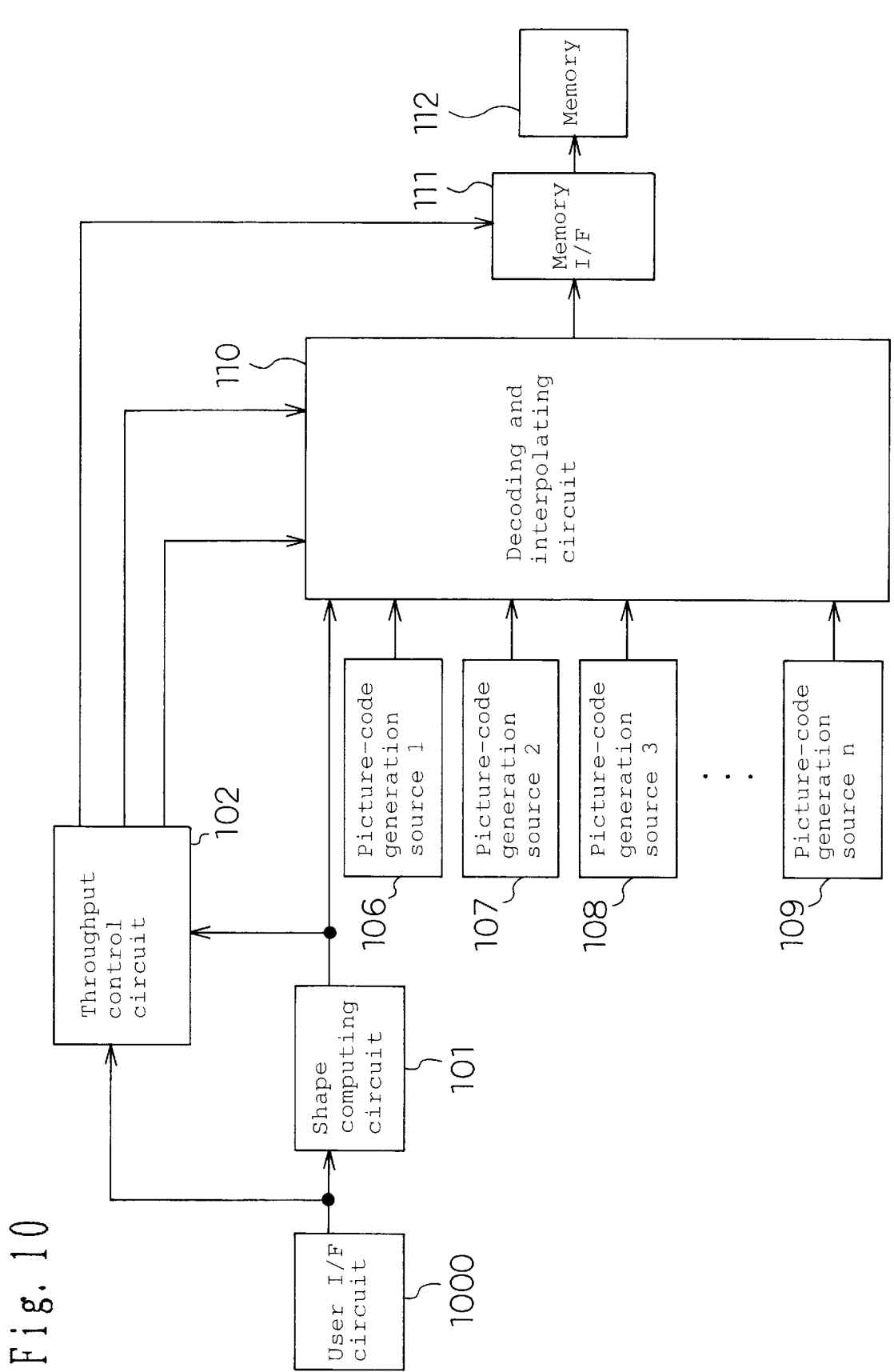
FIG. 10 is a block diagram of a picture data processor of an embodiment according to the second aspect of the present invention.

FIG. 10 shows a block diagram of the picture data processor of the embodiment 1 according to the second aspect of the present invention. The picture data processor of the embodiment 1 according to the second aspect of the present invention is constituted of a user I/F circuit 1000, a shape computing circuit 101, a throughput control circuit 102, a decoding and interpolating circuit 110, a memory I/F 111, and a memory 112. The shape computing circuit 101, throughput control circuit 102, and decoding and interpolating circuit 110 are respectively provided with configuration means for constituting each of them. The configuration means is described later.

FIG. 14(a) shows the display 501 of a personal computer. The display 501 of the personal computer is a display for displaying a picture supplied from the picture data processor of the embodiment 1 according to the second aspect of the present invention. As for the embodiment 1, it is assumed that five windows 503, 504, 505, 506, and 507 are displayed on the display 501 and a picture is displayed on each window. Moreover, it is assumed that pictures displayed on the windows 503, 505, 506, and 507 among the above five windows are pictures decoded from MPEG picture data.

The user I/F circuit 1000 is means for receiving designations for the size, shape, and position of a picture to be displayed on the display 501 in FIG. 14(a) by a user from a user.

Figure 11:
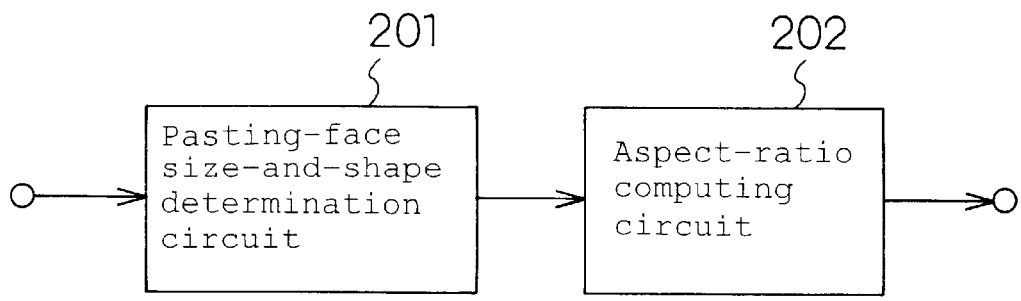
FIG. 11 is a block diagram of the shape processing circuit of the picture data processor of an embodiment according to the second aspect of the present invention.

The shape computing circuit 101 is means for computing enlargement/contraction ratios of a picture in the longitudinal and transverse directions when determining the size and shape of a window in accordance with the information for the size and shape of the window supplied from the user I/F circuit 1000 and enlarging or contracting the picture so as to fit the window. As shown in FIG. 11, the shape computing circuit 101 is provided;with a pasting-face size-and-shape determination circuit 201 and an aspect-ratio computing circuit 202. Specifically, the pasting-face size-and-shape determination circuit 201 determines the size and shape of a window and the aspect-ratio computing circuit 202 computes an enlargement/contraction ratio. Moreover, an enlargement/contraction ratio is information required to fit each picture obtained by decoding every DCT coefficient of the MPEG picture data supplied from picture-code generation source 1·106, picture-code generation source 2·107, picture-code generation source 3·108, . . . , or picture-code generation source n·109 to the size and shape of a corresponding window.

The picture-code generation source 1·106 is means for generating the encoded MPEG picture data of a picture to be displayed on the window 503 of the display 501 in FIG. 14(a). Similarly, each of the picture-code generation source 2·107, picture-code generation source 3·108, . . . , and picture-code generation source n·109 is means for generating encoded MPEG picture data of a picture displayed on the window 505, 506, or 507 of the display 501 in FIG. 14(a), respectively. Moreover, as for the embodiment 1, n is assumed to be equal to 4.

Figure 12:
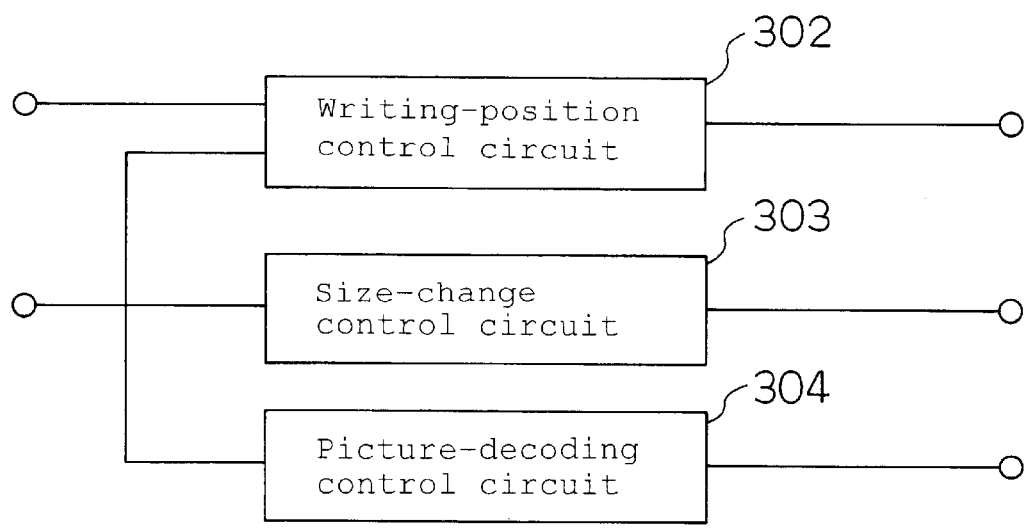
FIG. 12 is a block diagram of the throughput control circuit of the picture data processor of an embodiment according to the second aspect of the present invention.

The throughput control circuit 102 is means for specifying a picture writing position when the picture is written in the memory 112 so that the picture is accurately displayed on a window of the display 501 in FIG. 14(a) in accordance with the information supplied from the user I/F circuit 1000 and the information supplied from the shape computing circuit 101. Moreover, the throughput control circuit 102 is means for controlling a method for decoding MPEG picture data by the decoding and interpolating circuit 110 by using the above two pieces of information and moreover controlling the size and shape of the picture decoded from the MPEG picture data so as to fit the window. Specifying of the picture write position, the MPEG picture data decoding method, and control of the size and shape of the picture are explained later when describing operations of the picture data processor of the embodiment 1 according to the second aspect of the present invention. Moreover, as shown in FIG. 12, the throughput control circuit 102 is provided with a writing-position control circuit 302, a picture-decoding control circuit 304, and size-change control circuit 303.

Figure 13:
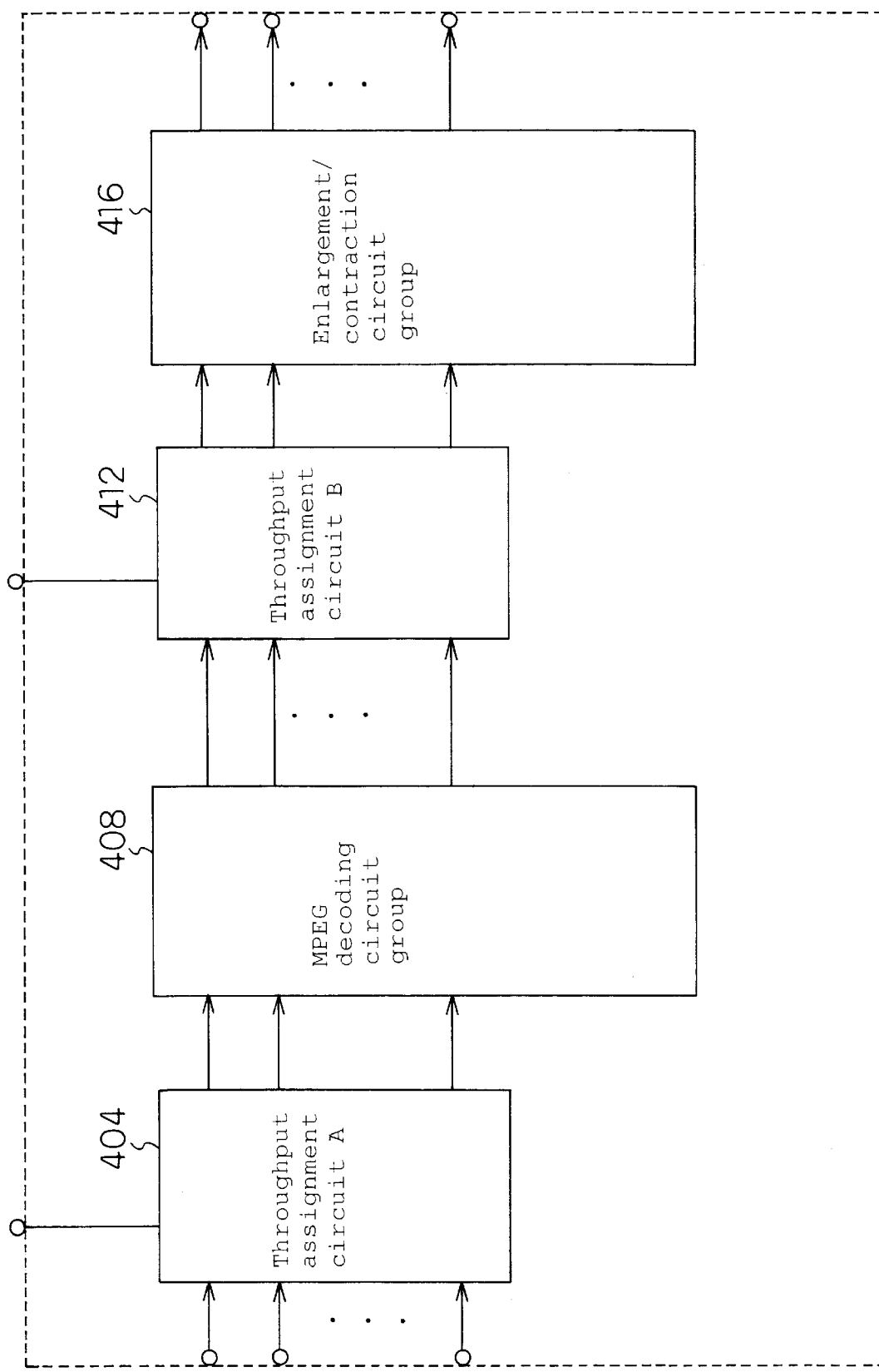
FIG. 13 is a block diagram of the decoding and interpolating circuit of the picture data processor of an embodiment according to the second aspect of the present invention.

The decoding and interpolating circuit 110 is means for inputting encoded MPEG picture data from each of the picture-code generation source 1·106, picture-code generation source 2·107, picture-code generation source 3·108, . . . , and picture-code generation source n·109, decoding each MPEG picture data, and thinning or interpolating pixels so as to fit each decoded picture to a corresponding window of the display 501 in FIG. 14(a) Moreover, as shown in FIG. 13, the decoding and interpolating circuit 110 is provided with a throughput assignment circuit-A 404, an MPEG decoding circuit group 408, a throughput assignment circuit-B 412, and an enlargement/contraction circuit group 416. Moreover, each of the MPEG decoding circuit group 408 and enlargement/contraction circuit group 416 is further provided with configuration means for constituting it. The configuration means is described later.

The memory I/F 111 is means for inputting a plurality of pictures from the enlargement/contraction circuit group 416 of the decoding and interpolating circuit 110 and the information for writing position of each picture when it is written in the memory 112 from the writing-position control circuit 302 of the throughput control circuit 102 and arranging the information for a writing position corresponding to each picture.

The memory 112 is means for inputting a plurality of informational sets of a picture and a writing position corresponding to the picture from the memory I/F 111 and storing pictures so that the pictures are displayed at predetermined positions on the display 501 in FIG. 14(a) in accordance with the input information for writing positions.

Then, operations of the picture data processor of the embodiment 1 according to the second aspect of the present invention are described below.

First, the user I/F circuit 1000 receives designations for sizes, shapes, and positions of windows of five pictures to be displayed on the display 501 in FIG. 14(a) by a user from the user and outputs the information for the designations to the pasting-face size-and-shape determination circuit 201 of the shape computing circuit 101 and the writing-position control circuit 302 of the throughput control circuit 102.

Then, the pasting-face size-and-shape determination circuit 201 of the shape computing circuit 101 determines sizes and shaped of the five windows in accordance with the information for the sizes and shapes of the five windows supplied from the user I/F circuit 1000 and outputs the information for determined sizes and shapes to the aspect-ratio computing circuit 202. Moreover, the aspect-ratio computing circuit 202 computes enlargement/contraction ratios of the pictures to be displayed on the five windows in accordance with the information and outputs the computation result to each configuration means of the throughput control circuit 102 and the throughput assignment circuit-A 404 of the decoding and interpolating circuit 110.

Thereafter, the writing-position control circuit 302 of the throughput control circuit 102 first inputs the information for sizes, shapes, and positions of five windows supplied from the user I/F circuit 1000 and the information for enlargement/contraction ratios of the pictures to be displayed on the five windows supplied from the aspect-ratio computing circuit 202 of the shape computing circuit 101. Moreover, picture writing positions when pictures are written in the memory 112 are specified so that the pictures are accurately displayed on five windows in accordance with the above two pieces of information and the information for specified writing positions is output to the memory I/F 111.

At the same time, the picture-decoding control circuit 304 of the throughput control circuit 102 determines a MPEG picture-data decoding method to be executed by the MPEG decoding circuit group 408 of the decoding and interpolating circuit 110 so as to decode a picture having a size and a shape closest to the size and shape of each of five windows in accordance with the information for enlargement/contraction ratios supplied from the aspect-ratio computing circuit 202 of the shape computing circuit 101. Moreover, the circuit 304 outputs the information for the decoding method to the throughput assignment circuit-A 404 of the decoding and interpolating circuit 110.

The decoding method determined by the picture-decoding control circuit 304 is specifically described below. To describe the decoding method, it is assumed that an illustration showing that every DCT coefficient of the MPEG picture data supplied from the picture-code generation source 1·106 is decoded is used as an original illustration of the picture-code generation source 1·106 and an enlarged or contracted illustration of the original illustration is displayed on the window 503 of the display 501 in FIG. 14(*a*). Moreover, FIGS. 15(*a*) to 15(*d*) show illustrations for explaining an MPEG picture data decoding method executed by the MPEG decoding circuit group 408 of the decoding and interpolating circuit 110.

Figure 15:
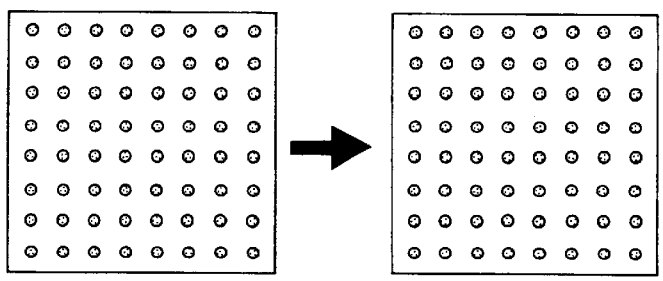
FIGS. 15(a) to 15(d) are illustrations for explaining an MPEG-picture-data decoding method executed by the MPEG decoding circuit group of the decoding and interpolating circuit of the picture data processor of an embodiment according to the second aspect of the present invention.
Figure 15:
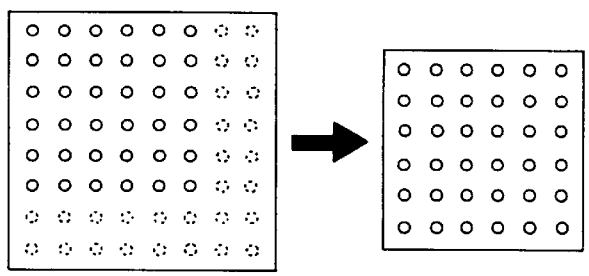
Figure 15:
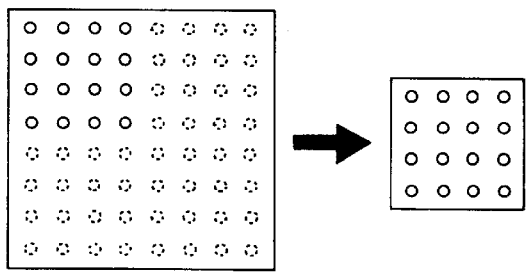
Figure 15:
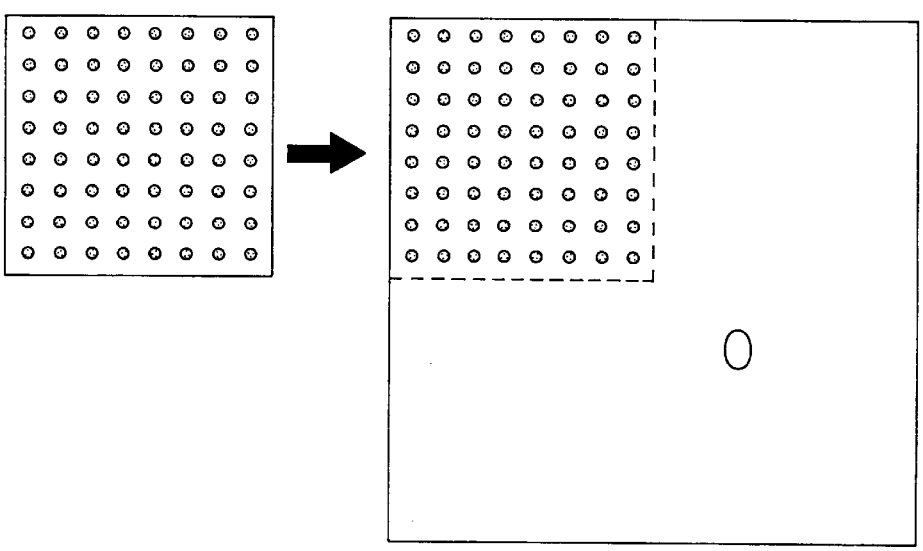

When the size of the original illustration of the picture-code generation source 1·106 is equal to or close to that of the window 503, the picture-decoding control circuit 304 determines a decoding method so as to make the MPEG decoding circuit group 408 decode every 8×8 DCT coefficient of the MPEG picture data supplied from the picture-code generation source 1·106. That is, as shown in FIG. 15(*a*), the MPEG decoding circuit group 408 decodes every DCT coefficient of the MPEG picture data supplied from the picture-code generation source 1·106.

Then, when the size of the window 503 is approx. ¾ the original illustration of the picture-code generation source 1·106 in both longitudinal and transverse directions, the picture-decoding control circuit 304 determines a decoding method so as to make the MPEG decoding circuit group 408 decode only low-frequency-side 6×6 coefficients among the DCT coefficients of the 8×8 MPEG picture data supplied from the picture-code generation source 1·106. That is, as shown in FIG. 15(*b*), the MPEG decoding circuit group 408 decodes only 6×6 DCT coefficients of the MPEG picture data supplied from the picture-code generation source 1·106. Moreover, when the size of the window 503 is approx. ½ the original illustration of the picture-code-generation source 1·106 in both longitudinal and transverse directions, the picture-decoding control circuit 304 determines a decoding method so as to make the MPEG decoding circuit group 408 decode only low-frequency-side 4×4 DCT coefficients, as shown in FIG. 15(*c*).

Furthermore, when the size of the window 503 is approx two times larger than the original illustration of the picture-code generation source 1·106 in both longitudinal and transverse directions, the picture-decoding control circuit 304 determines a decoding method so as to make the MPEG decoding circuit group 408 add a coefficient of zero to DCT coefficients of the 8×8 MPEG picture data supplied from the picture-code generation source 1·106 as a high-frequency-component coefficient and decode them as 16×16 coefficients. That is, as shown in FIG. 15(*d*), the MPEG decoding circuit group 408 adds a coefficient of zero to DCT coefficients of the 8×8 MPEG picture data supplied from the picture-code generation source 1·106 and decodes them as 16×16 coefficients. Furthermore, when the size of the window 503 is approx. natural number N times larger than the original illustration of the picture-code generation source 1·106 in both longitudinal and transverse directions, the picture-decoding control circuit 304 determines a decoding method so as to make the MPEG decoding circuit group 408 add a coefficient of zero to DCT coefficients of the 8×8 MPEG picture data supplied from the picture-code generation source 1·106 as a high-frequency-component coefficient and decode them as 8N×8N coefficients. Thus, when enlarging the original illustration of the picture-code generation source 1·106, the illustration is enlarged up to natural number N times.

As described above, the picture-decoding control circuit 304 of the throughput control circuit 102 determines an MPEG picture data decoding method to be executed by the MPEG decoding circuit group 408 of the decoding and interpolating circuit 110.

Moreover, when the method is determined, the size-change control circuit 303 of the throughput control circuit 102 simultaneously determines a method for enlarging or contracting a picture to be enlarged or contracted by the enlargement/contraction circuit group 416 of the decoding and interpolating circuit 110 so that the picture fits the size and shape of each of five windows in accordance with the information for enlargement/contraction ratios of a picture supplied from the aspect-ratio computing circuit 202 of the shape computing circuit 101.

According to description of the above decoding methods, the original illustration of the MPEG picture data supplied from the picture-code generation source 1·106 or the like is enlarged or contracted only up to a specific size such as a natural number N times or ⅝ or ⅜ times by the MPEG decoding circuit group 408. Therefore, when each window has a not-specified size such as ⅖ times the original illustration, the size-change control circuit 303 determines a method for enlarging or contracting a picture in order to make the enlargement/contraction circuit group 416 thin or interpolate pixels so that a picture to be decoded by the MPEG decoding circuit group 408 fits each window.

Moreover, the size-change control circuit 303 outputs the information for the determined enlargement/contraction method to the throughput assignment circuit-B 412 of the decoding and interpolating circuit 110.

The throughput assignment circuit-A 404 of the decoding and interpolating circuit 110 first inputs encoded MPEG picture data from each of the picture-code generation source 1·106, picture-code generation source 2·107, picture-code generation source 3·108, . . . , and picture-code generation source n·109. Then, the circuit-A 404 compares the information for enlargement/contraction of pictures based on a plurality of MPEG picture data values supplied from the aspect-ratio computing circuit 202 of the shape computing circuit 101 with the information for methods for decoding a plurality of MPEG picture data values supplied from the picture-decoding control circuit 304 of the throughput control circuit 102. Moreover, the throughput assignment circuit-A 404 determines some arithmetic units to be assigned to decode a plurality of MPEG picture data values out of a group of arithmetic units of the MPEG decoding circuit group 408 in accordance with the throughput for decoding the MPEG picture data values. The arithmetic units are described later. That is, the throughput assignment circuit-A 404 determines some arithmetic units to be assigned to decode MPEG picture data values out of a group of arithmetic units of the MPEG decoding circuit group 408 so that the MPEG decoding circuit group 408 can simultaneously decode a plurality of MPEG picture data values in parallel in accordance with the throughput for decoding the MPEG picture data values. Moreover, the throughput assignment circuit-A 404 outputs determined assignment information and the MPEG picture data supplied from each of the picture-code generation source 1·106, picture-code generation source 2·107, picture-code generation source 3·108, . . . , and picture-code generation source n·109 to the MPEG decoding circuit group 408 of the decoding and interpolating circuit 110.

Thereafter, the MPEG decoding circuit group 408 inputs assignment information and a plurality of MPEG picture data values from the throughput assignment circuit-A 404.

Figure 16:
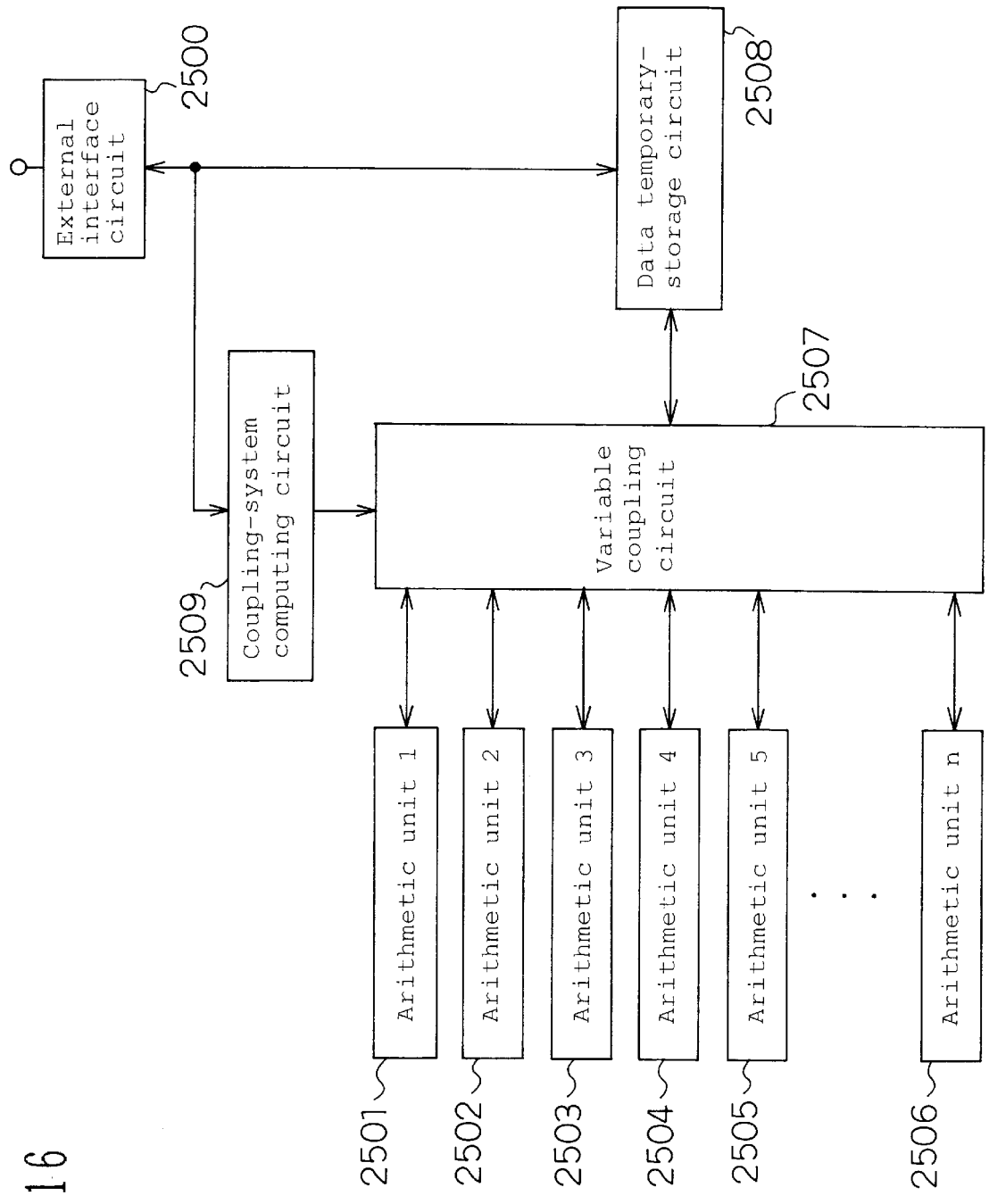
FIG. 16 is a block diagram of the MPEG decoding circuit group of the decoding and interpolating circuit of the picture data processor of an embodiment according to the second aspect of the present invention.

As shown in FIG. 16, the MPEG decoding circuit group 408 is constituted of an external interface circuit 2500, a coupling-system computing circuit 2509, a variable coupling circuit 2507, an arithmetic unit-1 2501, an arithmetic unit-2 2502, an arithmetic unit-3 2503, an arithmetic unit-4 2504, an arithmetic unit-5 2505, . . . , and an arithmetic unit-n 2506, and a data temporary-storage circuit 2508.

Therefore, the assignment information and a plurality of MPEG picture data values input to the MPEG decoding circuit group 408 are actually input to the external interface circuit 2500.

Moreover, the data temporary-storage circuit 2508 inputs a plurality of MPEG picture data values from the external interface circuit 2500 and temporarily stores them.

Furthermore, the coupling-system computing circuit 2509 inputs assignment information from the external interface circuit 2500 and outputs the information to the variable coupling circuit 2507.

Thereafter, the variable coupling circuit 2507 assigns the MPEG picture data values temporarily stored in the data temporary-storage circuit 2508 to some of a plurality of arithmetic units in accordance with the assignment information supplied from the coupling system computing circuit 2509. For example, the MPEG picture data corresponding to a large window of the display 501 in FIG. 14(*a*) is assigned to three arithmetic units as data requiring much throughput because the MPEG picture data includes a lot of DCT coefficients for decoding the data as described when a decoding method is explained. However, the MPEG picture data corresponding to a small window is assigned to one arithmetic unit as data requiring only a little throughput because the MPEG picture data includes a few coefficients for decoding the data. Specifically, three arithmetic units are assigned in FIG. 15(*a*) and one arithmetic unit is assigned in FIG. 15(*c*).

Moreover, one assigned unit or a plurality of assigned units decodes corresponding MPEG picture data. In this case, all or some of an assigned group of arithmetic units simultaneously decode a plurality of MPEG picture data values in parallel. The method for decoding the data values conforms to the decoding method determined by the picture-decoding control circuit 304 of the throughput control circuit 102 described by using FIGS. 15(*a*) to 15(*d*). However, description of the decoding method is omitted because it is already described. These decoded pictures are output to the throughput assignment circuit-B 412 of the decoding and interpolating circuit 110 through an external interface circuit 2500.

Then, the throughput assignment circuit-B 412 first inputs a plurality of pictures from the MPEG decoding circuit group 408. Then, the throughput assignment circuit-B 412 decides the throughput for thinning or interpolating pixels from pictures supplied from the MPEG decoding circuit group 408 so that each picture decoded by the MPEG decoding circuit group 408 fits the size and shape of a corresponding window in accordance with the information for enlargement/contraction of pictures supplied from the size-change control circuit 303 of the throughput control circuit 102. Moreover, the circuit-B 412 determines some arithmetic units to be assigned to process a plurality of pictures supplied from the MPEG decoding circuit group 408 out of a group of arithmetic units of the enlargement/contraction circuit group 416 in accordance with the above decision result. The determined arithmetic unit is the same as one of the arithmetic units of the MPEG decoding circuit group 408 described above. That is, the throughput assignment circuit-B 412 determines some arithmetic units to be assigned to process pictures out of a group of arithmetic units of the enlargement/contraction circuit group 416 so that the enlargement/contraction circuit group 416 can simultaneously process a plurality of pictures in parallel in accordance with the throughput for the pictures supplied from the MPEG decoding circuit group 408. Moreover, the throughput assignment circuit-B 412 outputs the determined assignment information and a plurality of pictures supplied from the MPEG decoding circuit group 408 to the enlargement/contraction circuit group 416 of the decoding and interpolating circuit 110.

Thereafter, the enlargement/contraction circuit group 416 inputs the assignment information and the pictures from the throughput assignment circuit-B 412.

The enlargement/contraction circuit group 416 is constituted of an external interface circuit, a coupling-system computing circuit, a variable coupling circuit, a plurality of arithmetic units, and data temporary-storage circuit similarly to the case of the MPEG decoding circuit group 408.

Figure 17B:
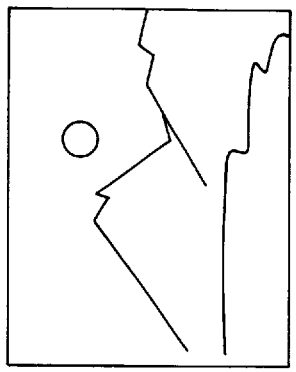
FIGS. 17(a)–(c) are illustrations for explaining the processings performed by the enlargement/contraction-circuit group of the picture data processor of an embodiment according to the second aspect of the present invention.
Figure 17A:
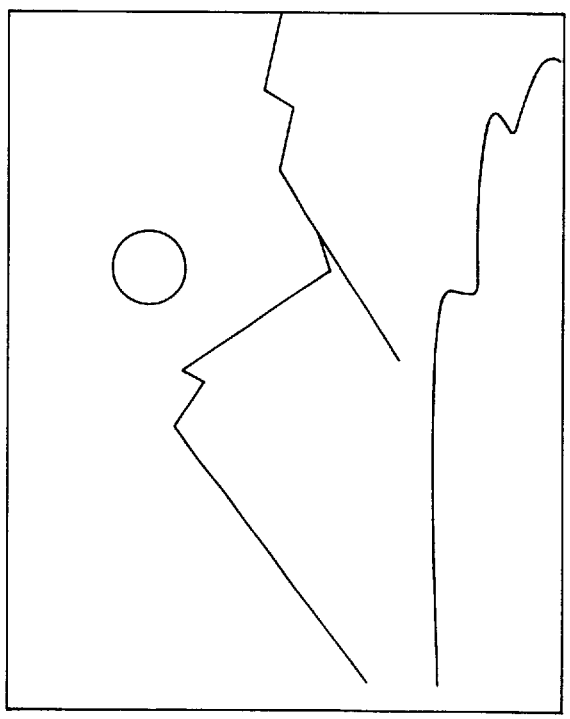
Figure 17C:
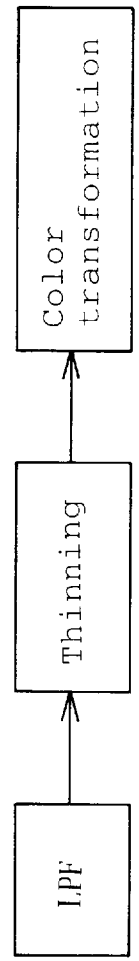

Therefore, as for the enlargement/contraction circuit group 416 similarly to the MPEG decoding circuit group 408, one assigned arithmetic unit or a plurality of assigned arithmetic units thins or interpolates pixels of a corresponding picture in accordance with the assignment information supplied from the throughput assignment circuit-B 412. For example, to contract the picture in FIG. 17(*a*) to the picture in FIG. 17(*b*), pixels are thinned. In this case, three arithmetic units perform the processing for preventing a folded distortion from occurring during the pixel thinning and one arithmetic unit performs pixel thinning. Moreover, two arithmetic units perform color transformation, if necessary. Thus, all or some of an assigned group of arithmetic units simultaneously thin or interpolate pixels of a plurality of pictures in parallel in accordance with the assignment information supplied from the throughput assignment circuit-B 412. In this case, the thinning or interpolation of the pixels is performed so as to fit the size and shape of a corresponding window. The pictures whose pixels are thinned or interpolated are output to the memory I/F 111 through an external interface circuit.

Then, the memory I/F 111 inputs a plurality of pictures supplied from the enlargement/contraction circuit group 416 and the writing position information when a picture is written in the memory 112 supplied from the writing-position control circuit 302 of the throughput control circuit 102 and arranges each picture and the information for the writing position corresponding to the picture for each of five windows of the display 501 in FIG. 14(*a*) and outputs the information to the memory 112 together with the pictures supplied from the enlargement/contraction circuit group 416.

Finally, the memory 112 stores the pictures so that each picture is accurately displayed at a predetermined position on the display 501 in FIG. 14(*a*). When the pictures stored in the memory 112 are reproduced, they are respectively displayed on their corresponding windows of the display 501 in FIG. 14(a).

It is also possible to use a media processor as the MPEG decoding circuit group 408 and the enlargement/contraction circuit group 416.

As for the embodiment 1, a case is described in which the throughput assignment circuit-A 404 is separated from the throughput assignment circuit-B 412 and the MPEG decoding circuit group 408 is separated from the enlargement/contraction circuit group 416. However, it is also possible to use the throughput assignment circuit-A 404 and throughput assignment circuit-B 412 as one throughput assignment circuit without separating them and the MPEG decoding circuit group 408 and the enlargement/contraction circuit group 416 as one picture data processing circuit without separating them. In this case, it is possible for the picture data processing circuit to decode MPEG picture data and enlarge or contract a picture through assigned units in accordance with the designation supplied from a throughput assignment circuit.

Figure 18:
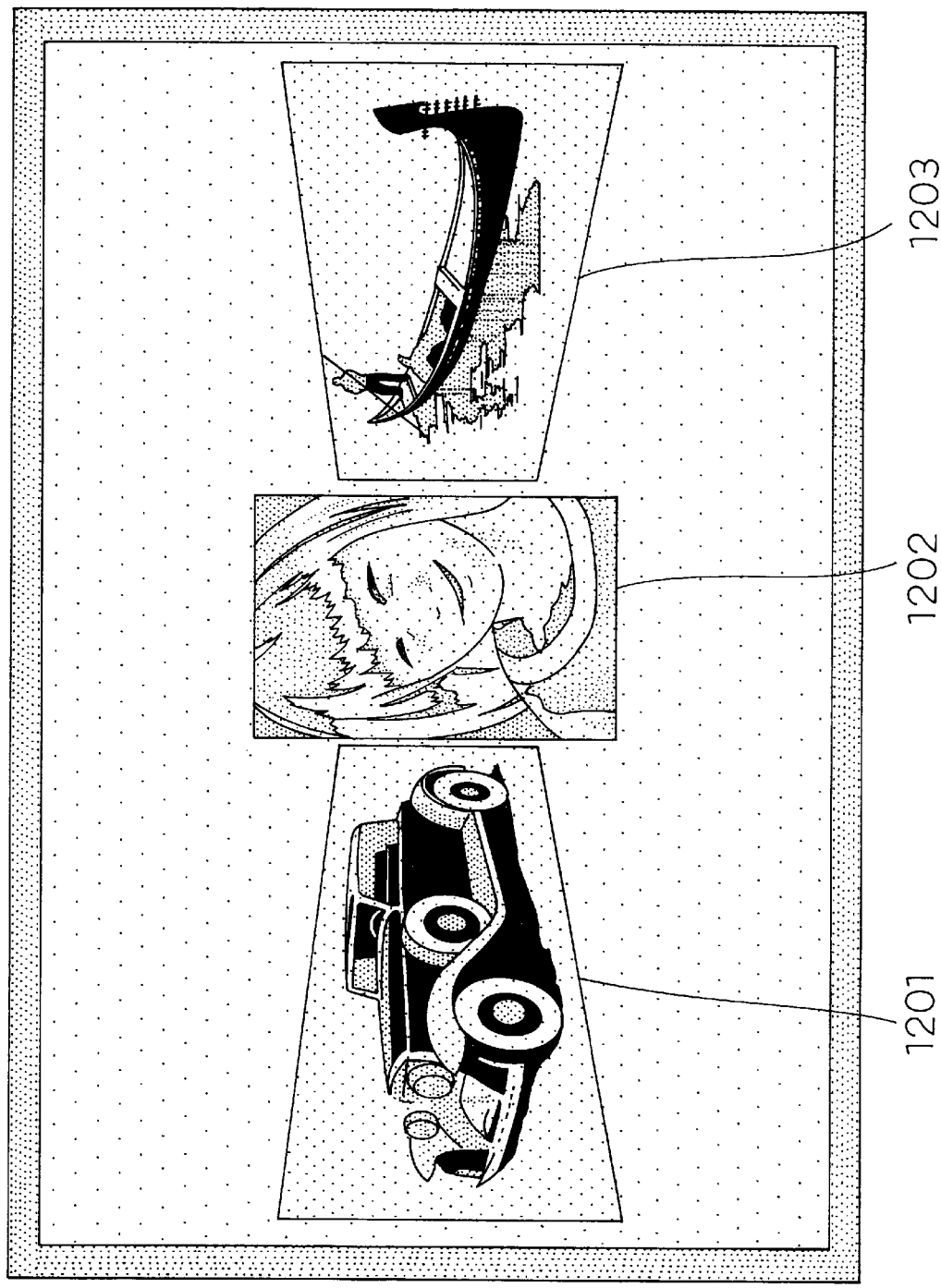
FIG. 18 is an example of a display of a personal computer used for an embodiment of the present invention other than the case of FIG. 14.

Moreover, as for the embodiment 1, a case is described in which a picture to be displayed on each window has the same enlargement/contraction ratio of the entire picture, as shown on the display 501 in FIG. 14(a). However, it is also possible to use a picture whose entire enlargement/contraction ratio is not the same but it is locally different like the pictures shown in the windows 1201 and 1203 of the display in FIG. 18. In this case, it is possible for the MPEG decoding circuit group 408 and enlargement/contraction circuit group 416 to process a picture having a locally-different enlargement/contraction ratio through arithmetic units corresponding to the throughput of the picture by assuming that the throughput of the picture is much compared to the case of generating a picture having the same enlargement/contraction ratio.

Embodiment 2 According to Second Aspect of the Present Invention

The configuration and operations of the picture data processor of the embodiment 2 according to the second aspect of the present invention are described below.

The configuration of the picture data processor of the embodiment 2 according to the second aspect of the present invention is the same as that of the picture data processor of the embodiment 1 according to the second aspect of the present invention but some of the operations of it are different from those of the picture data processor of the embodiment 1 according to the second aspect of the present invention.

Therefore, as for the embodiment 2, only operations different from those described for the embodiment 1 are described below.

Among five windows of the display 501 in FIG. 14(a), the windows 505 and 506 and the windows 506 and 507 are displayed so as to be overlapped each other. Therefore, when the user I/F circuit 1000 receives a designation from a user showing that these windows are displayed so that they are locally overlapped each other, the circuit 1000 outputs even the information for the overlapped state to the pasting-face size-and-shape determination circuit 201 of the shape computing circuit 101.

In this case, the pasting-face size-and-shape determination circuit 201 determines sizes and shapes of five windows by also using the overlap-state information supplied from the user I/F circuit 1000.

Thereafter, the aspect-ratio computing circuit 202 of the shape computing circuit 101 outputs the information for enlargement/contraction ratios of pictures displayed on five windows of the display 501 in FIG. 14(a) to each configuration means of the throughput control circuit 102 and the throughput assignment circuit-A 404 of the decoding and interpolating circuit 110 and moreover outputs the overlap-state information input by the user I/F circuit 1000 to each configuration means of the throughput control circuit 102 and the throughput assignment circuit-A 404.

Then, the writing-position control circuit 302 of the throughput control circuit 102 specifies writing positions of five pictures when the pictures are written in the memory 112 by using also the window overlap-state information supplied from the aspect-ratio computing circuit 202 of the shape computing circuit 101.

Moreover, the picture-decoding control circuit 304 of the throughput control circuit 102 determines a method for decoding MPEG picture data so that overlapped portions are not decoded when the MPEG decoding circuit group 408 of the decoding and interpolating circuit 110 decodes the MPEG picture data by using also the window overlap-state information supplied from the aspect-ratio computing circuit 202 of the shape computing circuit 101. That is, the picture-decoding control circuit 304 determines a decoding method for the windows 505 and 507 of the display 501 in FIG. 14(a) so that the MPEG picture data only for the pictures in the windows 508 and 509 in FIG. 14(b) are decoded by the MPEG decoding circuit group 408. In other words, the decoding method is determined so that the MPEG picture data for the pictures at portions where the windows 505 and 507 of the display 501 in FIG. 14(a) are hidden by window 506 is not decoded. As a result, the throughput by the MPEG decoding circuit group 408 under decoding is decreased.

Moreover, the size-change control circuit 303 of the throughput control circuit 102 determines a method for enlarging or contracting pictures decoded by the MPEG decoding circuit group 408 of the decoding and interpolating circuit 110 so that the pictures respectively fit the sizes and shapes of their corresponding five windows by using also the window overlap state information supplied from the aspect-ratio computing circuit 202 of the shape computing circuit 101. That is, the enlargement/contraction method is determined so that the pictures at portions where the windows 505 and 507 of the display 501 in FIG. 14(a) are hidden by the window 506 of the display 501 are not processed by the enlargement/contraction circuit group 416 of the decoding and interpolating circuit 110. As a result, the throughput by the enlargement/contraction circuit group 416 is decreased.

Then, the throughput assignment circuit-A 404 of the decoding and interpolating circuit 110 determines some arithmetic units to be assigned to decode the MPEG picture data for a plurality of pictures out of a group of arithmetic units of the MPEG decoding circuit group 408 by using-the information for a decoding method in which a window overlap-state is considered supplied from the picture-decoding control circuit 304 of the throughput control circuit 102. That is, the throughput assignment circuit-A 404 determines the assignment of arithmetic unit group of the MPEG decoding circuit group 408 so that the amount of MPEG picture data to be decoded is decreased by a value equivalent to the portions where the windows 505 and 507 of the display 501 in FIG. 14(a) are hidden by the window 506 compared to the case of the embodiment 1.

Then, the throughput assignment circuit-B 412 of the decoding and interpolating circuit 110 determines some arithmetic units to be assigned to process a plurality of pictures supplied from the MPEG decoding circuit group 408 out of a group of arithmetic units of the enlargement/contraction circuit group 416 so that a picture supplied from the MPEG decoding circuit group 408 fits the size and shape of a corresponding window by using the information for an enlargement/contraction method in which a window overlap-state is considered supplied from the size-change control circuit 303 of the throughput control circuit 102. That is, the throughput assignment circuit-B 412 determines assignment of a group of arithmetic units of the enlargement/contraction circuit group 416 so that the enlargement/contraction value of pictures is decreased by a value equivalent to the portions where the windows 505 and 507 of the display 501 in FIG. 14(*a*) are hidden by the window 506 compared to the case of the embodiment 1.

Moreover, the memory I/F 111 inputs a plurality of pictures from the enlargement/contraction circuit group 416 and the writing position information when a picture is written in the memory 112 supplied from the writing-position control circuit 302 of the throughput control circuit 102 and writes only the portions shown in FIG. 14(*b*) of the windows 505 and 507 of five windows in FIG. 14(*a*) in the memory 112.

As a result, when pictures stored in the memory 112 are reproduced, they are displayed on their corresponding windows of the display 501 in FIG. 14(*a*) similarly to the case of the embodiment 1.

Embodiment 3 According to Second Aspect of the Present Invention

The configuration and operations of the picture data processor of the embodiment 3 according to the second aspect of the present invention are described below.

The configuration of the picture data processor of the embodiment 3 according to the second aspect of the present invention is the same as that of the picture data processor of the embodiment 1 according to the second aspect of the present invention but some of the operations are different from those of the picture data processor of the embodiment 1 or 2 according to the second aspect of the present invention.

Therefore, as for the embodiment 3, only operations different from those described for the embodiment 1 or 2 are described.

As for the embodiments 1 and 2, a case is described in which five pictures are displayed on the display 501 in FIG. 14(*a*). However, when the number of pictures increases up to, for example, 20, the MPEG decoding circuit group 408 or enlargement/contraction circuit group 416 of the decoding and interpolating circuit 110 may not be able to process the pictures due to a lot of throughput even if all the arithmetic units of the arithmetic unit group process the pictures.

In this case, the user I/F circuit 1000 inputs the information for the priority of processing of each MPEG picture data from the user and outputs the information for the priority of processing of each MPEG picture data to the picture-decoding control circuit 304 and size-change control circuit 303 of the throughput control circuit 102.

The picture-decoding control circuit 304 determines a method for decoding each MPEG picture data so as not to exceed the throughput by all the arithmetic units of the MPEG decoding circuit group 408 of the decoding and interpolating circuit 110 and so that only low-frequency DCT coefficients are decoded starting with the lowest-priority MPEG picture data at a size further contracted from the size of a corresponding window in accordance with the information for the priority of processing of each picture supplied from the user I/F circuit 1000. That is, the picture-decoding control circuit 304 reduces the decoding throughput starting with the MPEG picture data having the lowest priority. In this case, the throughput assignment circuit-A 404 of the decoding and interpolating circuit 110 determines some arithmetic units to be assigned to decode each of a plurality of MPEG picture data values out of the arithmetic unit group of the MPEG decoding circuit group 408 in accordance with the decoding method determined by the picture-decoding control circuit 304.

The size-change control circuit 303, in the same way as the picture-decoding control circuit 304, determines a method for enlarging or contracting each picture supplied from the MPEG decoding circuit group 408 so as not to exceed the throughput by all the arithmetic units of the enlargement/contraction circuit group 416 of the decoding and interpolating circuit 110 but so as to reduce the throughput starting with the picture decoded from the MPEG picture data having the lowest priority in accordance with the information for the priority of processing of each picture supplied from the user I/F circuit 1000. That is, the size-change control circuit 303 reduces the enlargement/contraction throughput starting with the picture decoded from the MPEG picture data having the lowest priority. In this case, for example, to enlarge a picture decoded from MPEG picture data having a low priority, the throughput is reduced by arranging simply-computed picture signals around a predetermined position. However, an enlarged picture becomes a picture similar to a mosaic picture. Moreover, the throughput assignment circuit-B 412 of the decoding and interpolating circuit 110 determines some arithmetic units to be assigned to enlarge or contract a plurality of pictures out of the arithmetic units of the enlargement/contraction circuit group 416 in accordance with the enlargement/contraction method determined by the size-change control circuit 303.

As for the embodiment 3, the user I/F circuit 1000 inputs the priority information for the processing of each MPEG picture data from a user. However, it is also preferable to previously set rules for determining priority information to the picture-decoding control circuit 304 and size-change control circuit 303. Moreover, it is preferable for the picture-decoding control circuit 304 and size-change control circuit 303 to respectively determine a decoding method and an enlargement/contraction method in accordance with predetermined rules. The predetermined rules can be rules for setting the highest priority to the picture processing of the window nearest from you of a display and the lowest priority to the picture processing of the window farthest from you of the display or rules for setting the highest priority to the picture processing of the window finally operated and the lowest priority to the window initially operated. Moreover, the predetermined rules can be rules based on the size of a window such as rules for setting the highest priority to the largest window. Furthermore, the predetermined rules can be rules that priority depends on the signal source of MPEG picture data. For example, the predetermined rules can be rules that the priority of the picture processing of the MPEG picture data supplied from a TV tuner serving as a signal source is higher than the priority of the picture processing of the MPEG picture data supplied from a DVD or digital video serving as a signal source. Furthermore, the predetermined rules can be rules whose setting can be changed by a user. Furthermore, it is preferable to use rules that the designation by a user has priority to predetermined rules so that a user can change priorities so that a window 2 has the third priority and a window 3 has the second priority even if the predetermined rules are rules for setting, for example, the highest priority to a window 1, the second priority to the window 2, the third priority to the window 3, and the fourth priority to a window 4.

Furthermore, as for the embodiment 3, the information for the priority of the processing of each MPEG picture data can be the information for lowering the frame rate of each picture.

Enlargement/contraction-information input means according to the second aspect of the present invention is constituted of the user I/F circuit 1000, shape computing circuit 101, and throughput control circuit 102. Picture processing means is constituted of the MPEG decoding circuit group 408 and enlargement/contraction circuit group 416 of the decoding and interpolating circuit 110. Assignment means is constituted of the throughput assignment circuit-A 404 and throughput assignment circuit-B 404 of the decoding and interpolating circuit 110. However, the enlargement/contraction-information input means according to the second aspect of the present invention can use not only the means constituted of the user I/F circuit 1000, shape computing circuit 101, and throughput control circuit 102 but also any other means as long as the means inputs the information for the degree of enlargement/contraction of picture data. Moreover, the picture processing means can use not only the means constituted of the MPEG decoding circuit group 408 and enlargement/contraction circuit group 416 of the decoding and interpolating circuit 110 but also any other means as long as the means has a plurality of processing units for processing a plurality of picture data values, inputs picture data, and processes pictures in accordance with the information for the degree of enlargement/contraction of picture data supplied from the enlargement/contraction-information input means and a group of processing units assigned by the assignment means. Moreover, the assignment means can use not only the means constituted of the throughput assignment circuit-A 404 and throughput assignment circuit-B 404 of the decoding and interpolating circuit 110 but also any other means as long as the means inputs the information for the degree of enlargement/contraction of picture data from the enlargement/contraction-information input means and assigns all or some of a group of processing units of the picture processing means to the enlargement/contraction processing of the picture data corresponding to the information for the degree of enlargement/contraction of the picture data in accordance with the information for the degree of enlargement/contraction of the picture data.

As for the above embodiments, a case is described in which encoded MPEG picture data is decoded and the picture decoded from the encoded MPEG picture data is enlarged or contracted. It is also possible to make a picture data processor according to the second aspect of the present invention input a plurality of pictures in which encoded MPEG picture data is completely decoded and determine a group of arithmetic units to be assigned in accordance with the throughput determined correspondingly to the enlargement/contraction ratio for enlarging or contracting the pictures so that the assigned arithmetic units enlarge or contract the pictures.

Moreover, as for the above embodiments 1 and 2, a case is described in which five pictures are displayed on one display. However, the number of pictures to be displayed on the display is not restricted to five. In short, it is only necessary that the number of pictures to be displayed on the display is two or more.

As described above, the second aspect of the present invention makes it possible to provide a picture data processor for flexibly processing a plurality of MPEG picture data values even when reproducing the MPEG picture data values and displaying a plurality of pictures on the display of a personal computer or the like at the same time.

Then, embodiments according to the third aspect of the present invention are described below by referring to the accompanying drawings.

Embodiment 1 according to third aspect of the Present Invention

First, the configuration of the variable-length-code decoder of the embodiment 1 according to the third aspect of the present invention is described below.

Figure 19:
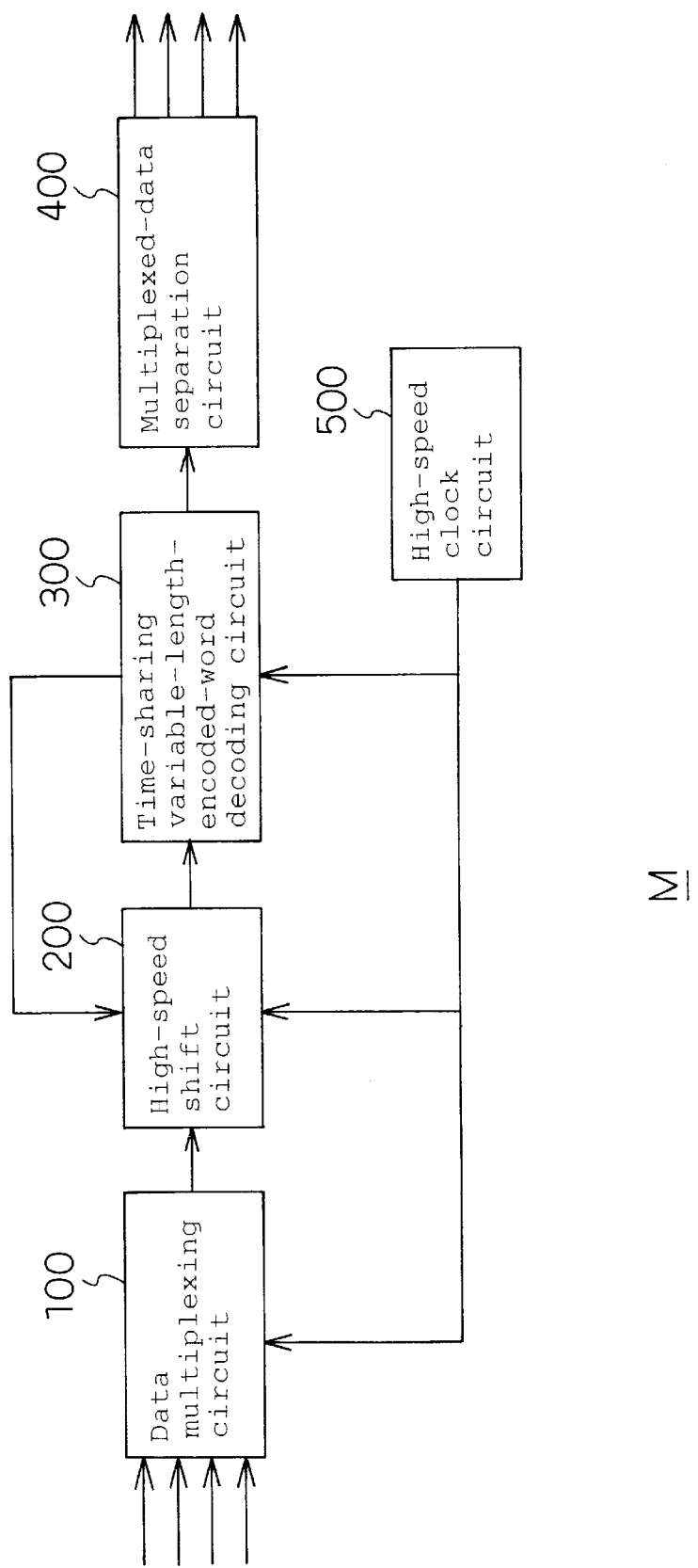
FIG. 19 is a block diagram of the variable-length-code decoder of an embodiment according to the third aspect of the present invention.

FIG. 19 is a block diagram of the variable-length-code decoder of the embodiment 1 according to the third aspect of the present invention. The variable-length-code decoder M of the embodiment 1 according to the third aspect of the present invention is constituted of a data multiplexing circuit 100, a high-speed shift circuit 200, a time-sharing variable-length-encoded-word decoding circuit 300, a multiplexed-data separation circuit 400, and a high-speed clock circuit 500. Moreover, the high-speed shift circuit 200 and time-sharing variable-length-encoded-word decoding circuit 300 are respectively provided with configuration means for constituting them.

Figure 20:
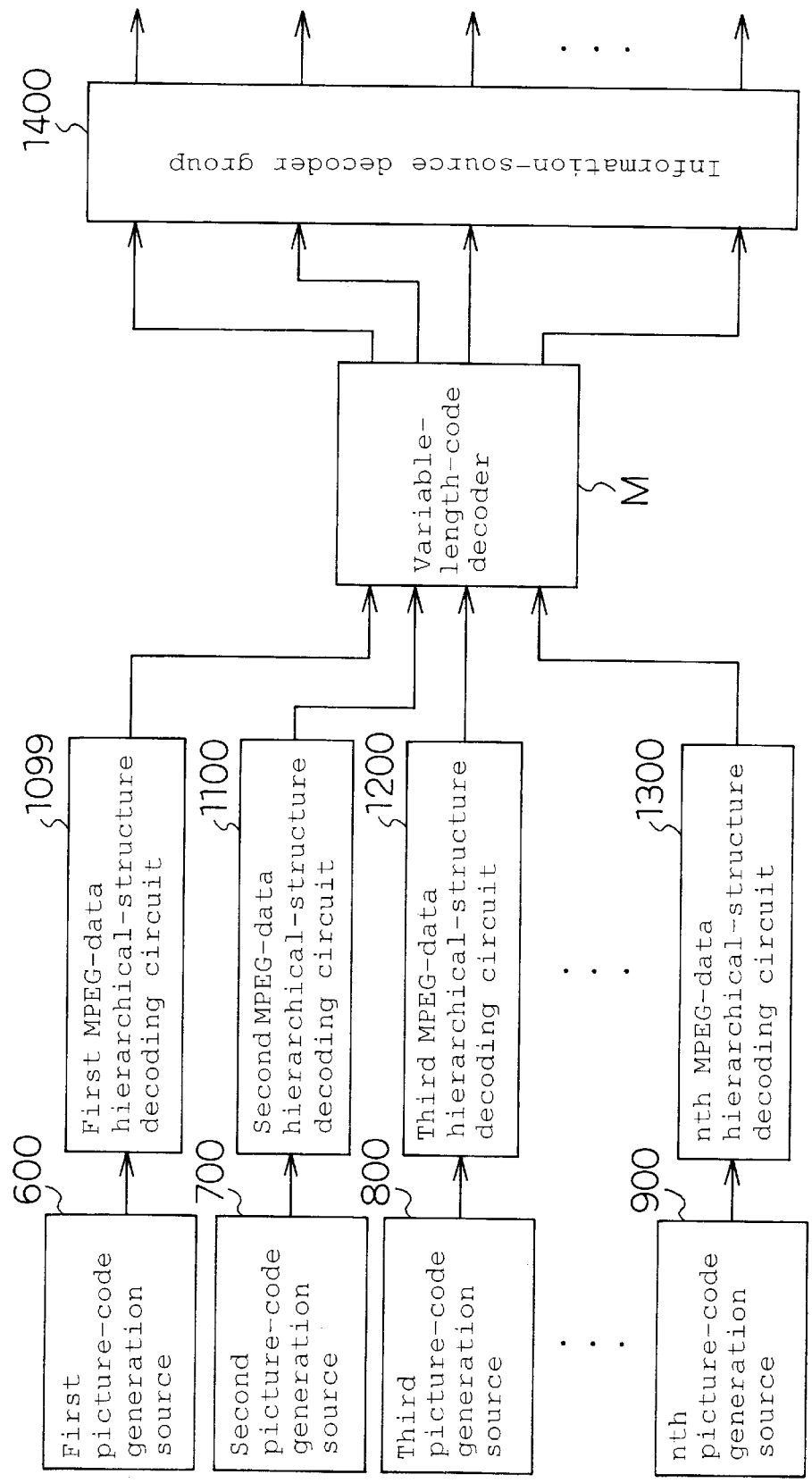
FIG. 20 is an illustration for explaining operations of the variable-length-code decoder of an embodiment according to the third aspect of the present invention.

FIG. 20 shows a first picture-code generation source 600, a second picture-code generation source 700, a third picture-code generation source 800, an nth picture-code generation source 900, a first MPEG-data hierarchical-structure decoding circuit 1099, a second MPEG-data hierarchical-structure decoding circuit 1100, a third MPEG-data hierarchical-structure decoding circuit 1200, an nth MPEG-data hierarchical-structure decoding circuit 1300, and an information-source decoder group 1400, in addition to the above variable-length-code decoder M.

For the convenience of the description below, the following are first described: the first picture-code generation source 600, second picture-code generation source 700, third picture-code generation source 800, nth picture-code generation source 900, first MPEG-data hierarchical-structure decoding circuit 1099, second MPEG-data hierarchical-structure decoding circuit 1100, third MPEG-data hierarchical-structure decoding circuit 1200, and nth MPEG-data hierarchical-structure decoding circuit 1300.

Each of the first picture-code generation source 600, second picture-code generation source 700, third picture-code generation source 800, and nth picture-code generation source 900 is means for generating variable-length-encoded MPEG picture data of a picture displayed on the display of a personal computer or the like. Moreover, as for the embodiment 1, it is assumed that n is equal to 4. Furthermore, to simplify the following description, data streams supplied from the first picture-code generation source 600, second picture-code generation source 700, third picture-code generation source 800, and nth picture-code generation source 900 are referred to as a first data stream, a second data stream, a third data stream, and a fourth data stream.

The first MPEG-data hierarchical-structure decoding circuit 1099 is means for inputting the variable-length-encoded MPEG picture data from the first picture-code generation source 600, that is, the first data stream and analyzing the format of a picture of the data about whether the data is constituted of a movement vector and difference data. Moreover, the second MPEG-data hierarchical-structure decoding circuit 1100, third MPEG-data hierarchical-structure decoding circuit 1200, and nth MPEG-data hierarchical-structure decoding circuit 1300 are means for inputting variable-length-encoded MPEG picture data values of the second, third, and fourth data streams and analyzing the formats of pictures of the data values. As for the embodiment 1, it is assumed that n is equal to 4.

The data multiplexing circuit 100 inputs variable-length-encoded MPEG picture data values of the first, second, third, and fourth data streams and multiplexing-the data values of the data streams. Moreover, the data multiplexing circuit 100 inputs a high-speed clock signal from the high-speed clock circuit 500 and multiplexes data at a high speed according to the high-speed clock signal.

Figure 21:
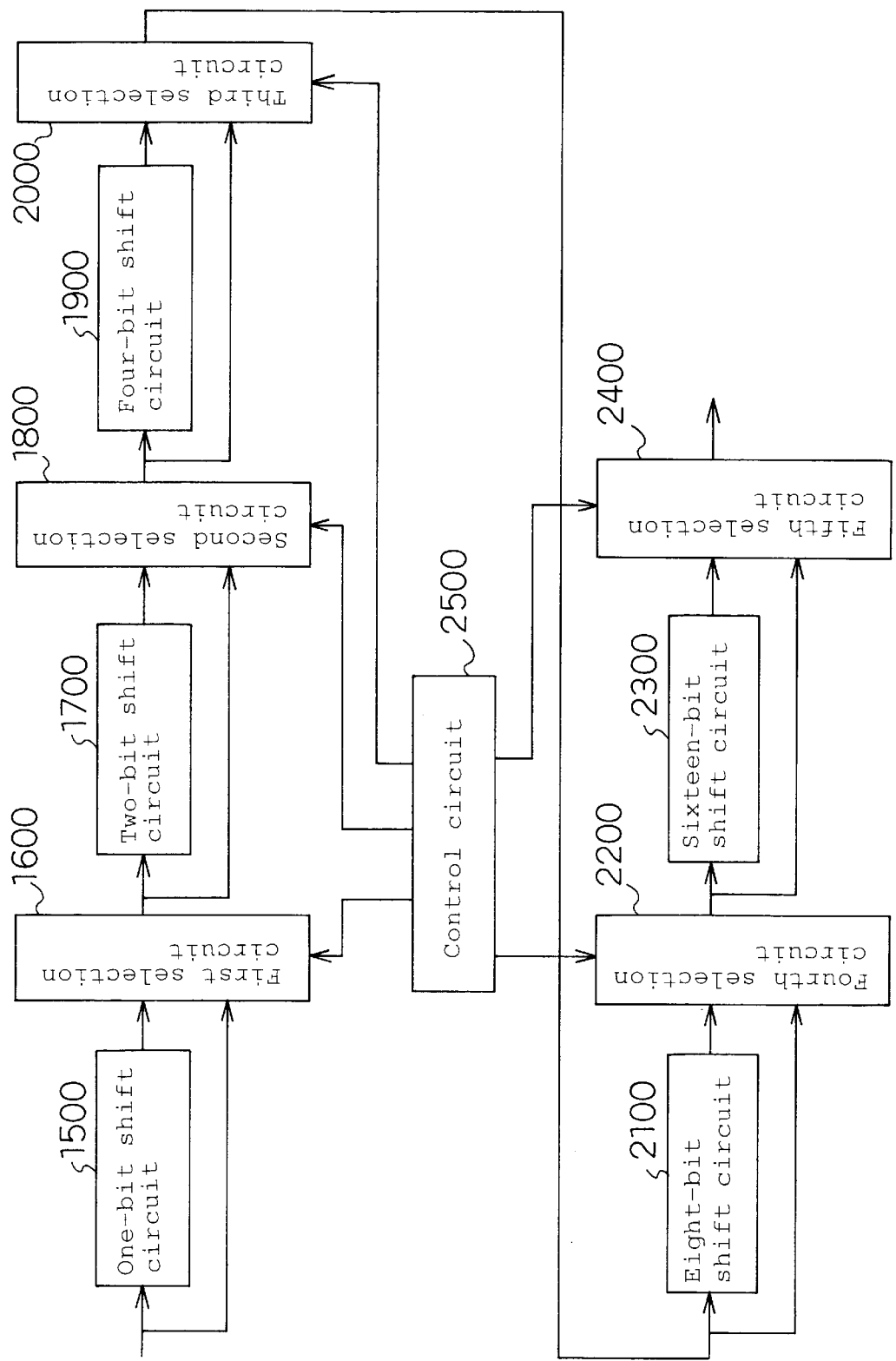
FIG. 21 is a block diagram of the high-speed shift circuit of the variable-length-code decoder of an embodiment 1 according to the third aspect of the present invention.

The high-speed shift circuit 200 is means for successively and continuously inputting the foremost 64-bit data among the variable-length-encoded MPEG picture data values of the first, second, third, and fourth data streams input by the data multiplexing circuit 100 from each data stream by means of time-sharing. Moreover, the circuit 200 is means for shifting data in accordance with the designation by the time-sharing variable-length-encoded-word decoding circuit 300 to be mentioned later. The shifting is described in detail when describing operations of a variable-length-code decoder. Furthermore, as shown in FIG. 21, the high-speed shift circuit 200 is provided with a one-bit shift circuit 1500, a first selection circuit 1600, a two-bit shift circuit 1700, a second selection circuit 1800, a four-bit shift circuit 1900, a third selection circuit 2000, an eight-bit shift circuit 2001, a fourth selection circuit 2200, a sixteen-bit shift circuit 2300, a fifth selection circuit 2400, and a control circuit 2500. Moreover, each configuration means of the high-speed shift circuit 200 shown in FIG. 21 is described later in detail.

Figure 22:
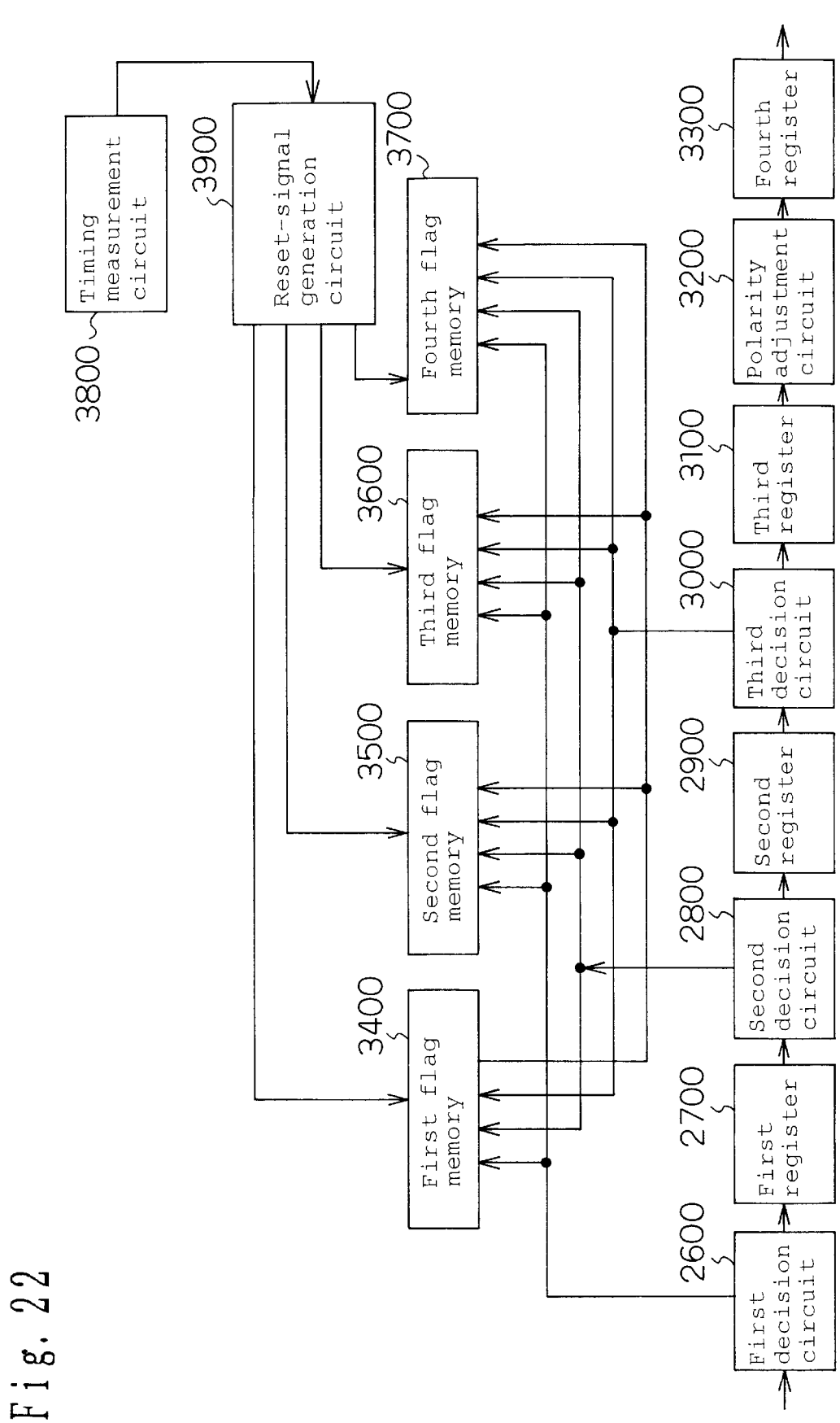
FIG. 22 is a block diagram of the time-sharing variable-length-encoded-word decoding circuit of the variable-length-code decoder of an embodiment according to the third aspect of the present invention.

The time-sharing variable-length-encoded-word decoding circuit 300 is means for successively detecting the foremost encoded word and its length of the foremost 64-bit data of each of the variable-length-encoded MPEG picture data values of the first, second, third, and fourth data streams input by the high-speed shift circuit 200 and variable-length-decoding the encoded word. As shown in FIG. 22, the time-sharing variable-length-encoded-word decoding circuit 300 is provided with a first decision circuit 2600, a first register 2700, a second decision circuit 2800, a second register 2900, a third decision circuit 3000, a third register 3100, a polarity adjustment circuit 3200, a fourth register 3300, a first flag memory 3400, a second flag memory 3500, a third flag memory 3600, a fourth flag memory 3700, a timing measurement circuit 3800, and a rest-signal generation circuit 3900. Each configuration means of the time-sharing variable-length-encoded-word decoding circuit 300 shown in FIG. 22 is also described later in detail.

The multiplexed-data separation circuit 400 is means for separating the variable-length-decoded data values of the first, second, third, and fourth data streams supplied from the time-sharing variable-length-encoded-word decoding circuit 300 every data stream.

The high-speed clock circuit 500 is means for quickly controlling inputting and multiplexing of data by the data multiplexing circuit 100, inputting and shifting of data by the high-speed shift circuit 200, and variable-length-decoding by the time-sharing variable-length-encoded-word decoding circuit 300.

Moreover, the information-source decoder group 1400 in FIG. 20 is means for decoding the variable-length-decoded data for each data stream separated by the multiplexed-data separation circuit 400 of a variable-length-code decoder to a picture.

Then, operations of the variable-length-code decoder of the embodiment 1 according to the third aspect of the present invention are described below.

First, the data multiplexing circuit 100 inputs and multiplexes the variable-length-encoded MPEG picture data supplied from each of the first picture-code generation source 600, second picture-code generation source 700, third picture-code generation source 800, and nth picture-code generation source 900 through the first MPEG-data hierarchical-structure decoding circuit 1099, second MPEG-data hierarchical-structure decoding circuit 1100, third MPEG-data hierarchical-structure decoding circuit 1200, or nth MPEG-data hierarchical-structure decoding circuit 1300 respectively. The data multiplexing circuit 100 multiplexes data at a high speed according to the high-speed clock signal supplied from the high-speed clock circuit 500. That is, the data multiplexing circuit 100 multiplexes the data values of the first, second, third, and fourth data streams at a high speed.

Figure 23:
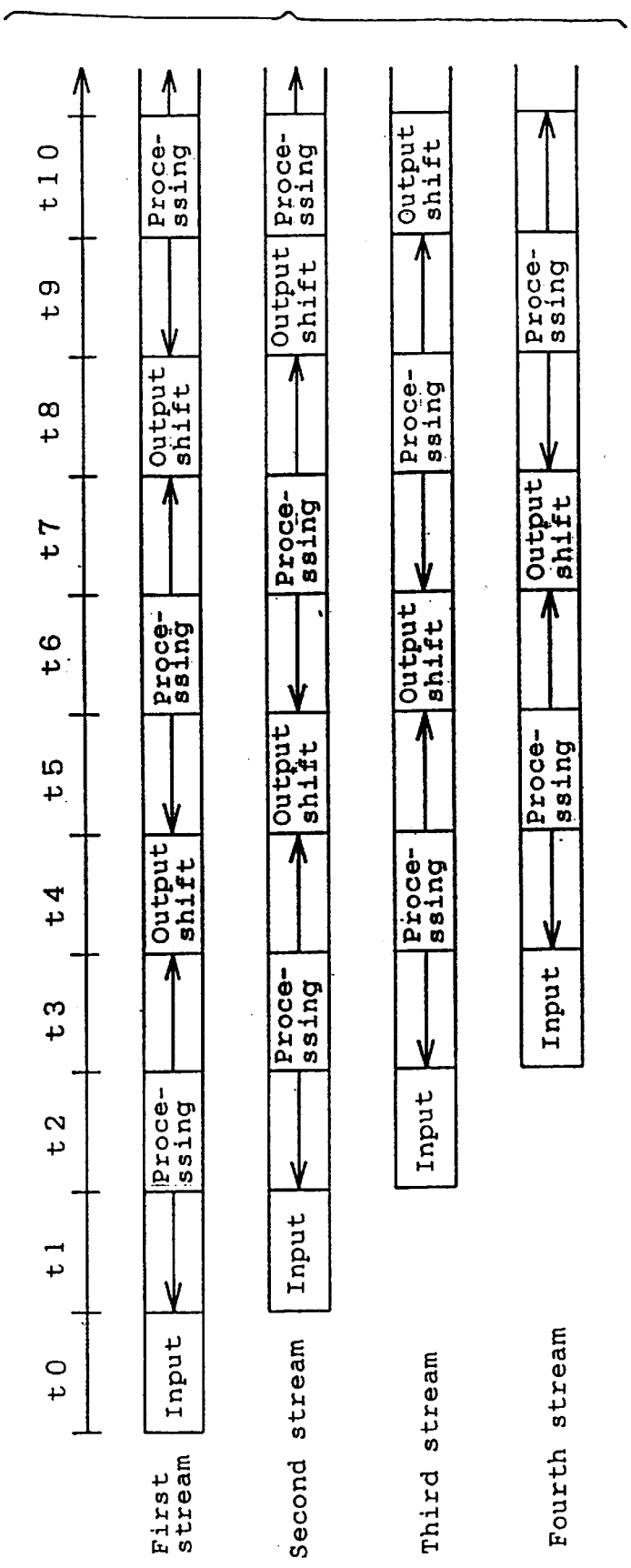
FIG. 23 is an illustration for explaining operations of the high-speed shift circuit and time-sharing variable-length-encoded-word decoding circuit of the variable-length-code decoder of an embodiment according to the third aspect of the present invention.
Figure 24:
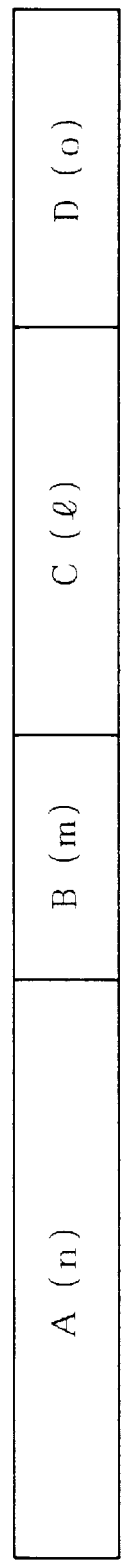
FIG. 24 is an illustration showing an example of variable-length-encoded data.

Moreover, the high-speed shift circuit 200 successively and continuously inputs the foremost 64-bit data among the variable-length-encoded MPEG picture data values of the first, second, third, and fourth data streams input by the data multiplexing circuit 100 from each data stream by means of time-sharing. The inputting operation is further described by referring to FIG. 23. FIG. 23 is an illustration showing the timing of a predetermined processing applied to each data of the first, second, third, and fourth data streams by the high-speed shift circuit 200 or time-sharing variable-length-encoded-word decoding circuit 300. It is assumed that each block in FIG. 23 represents the 64-bit data of the first, second, third, or fourth data stream and t0, t1, t2, t3, . . . respectively represent timing, that is, time. As shown in FIG. 23, the high-speed shift circuit 200 first inputs the foremost 64-bit data of the first data stream at the timing t0. Thereafter similarly, the circuit 200 inputs the foremost 64-bit data values of the second, third, and fourth data streams at the timings of t1, t2, and t3 respectively. FIG. 24 shows foremost 64 bits of the first data stream input to the high-speed shift circuit 200 at the timing t0. It is assumed that the 64 bits are constituted of encoded words A, B, C, and D and word lengths of the encoded words A, B, C, and D are n, m, l, and o bits.

However, the number of bits of the word length of the foremost encoded word of the foremost 64-bit data of the first data stream inputted at timing t0 by the high-speed shift circuit 200 is unknown. That is, it is unknown at the timing t0 that the foremost encoded word of foremost 64 bits of the first data stream is the encoded word A in FIG. 24 and the encoded word A is constituted of n bits.

Therefore, the time-sharing variable-length-encoded-word decoding circuit 300 detects the foremost encoded word and its word length by using a uniquely-separable table, variable-length-decodes the foremost encoded word, and outputs the information showing the number of bits of the word length of the foremost encoded word to the high-speed shift circuit 200. That is, the circuit 300 detects and variable-length-decodes the encoded word A and outputs the information showing that the encoded word A is constituted of n bits to the high-speed shift circuit 200. These processings are performed between the timings t1 and t3 in FIG. 23. Moreover, the variable-length-decoded foremost encoded word of the first data stream is output to the multiplexed-data separation circuit 400 at the timing t4.

Similarly, the time-sharing variable-length-encoded-word decoding circuit 300 detects the foremost encoded words of the second, third, and fourth data streams input by the high-speed shift circuit 200 at the timings of t1, t2, and t3 and the word lengths of the encoded words by using a uniquely-separable table, variable-length-decodes the foremost encoded words, and outputs the information showing the number of bits of the word lengths of the foremost encoded words to the high-speed shift circuit 200. These processings are performed between the timings t2 and t4 in FIG. 23 as for the second data stream, between the timings t3 and t5 in FIG. 23 as for the third data stream, and between the timings t4 and t6 in FIG. 23 as for the fourth data stream. Moreover, the foremost encoded word of the second data stream is output to the multiplexed-data separation circuit 400 at the timing t5, that of the third data stream is output to the circuit 400 at the timing t6, and that of the fourth data stream is output to the circuit 400 at the timing t7.

Then, operations of the time-sharing variable-length-encoded-word decoding circuit 300 and those of the high-speed shift circuit 200 performed between the timings t1 and t5 in FIG. 23 are further described below by referring to FIGS. 21 and 4. To describe them, it is assumed that each encoded word of variable-length-encoded MPEG picture data is data of up to 16 bits and the data includes positive- and negative-polarity data.

At the timing t1, the first decision circuit 2600 of the time-sharing variable-length-encoded-word decoding circuit 300 in FIG. 22 detects presence or absence of an encoded word in the foremost 8-bit data of the first data stream by using the above uniquely-separable table, and when an encoded word is detected, variable-length-decodes the encoded word and outputs it to the second decision circuit 2800 through the first register 2700, and moreover outputs the information showing the number of bits of output data to the first flag memory 3400. The first flag memory 3400 outputs the information for the bits to the control circuit 2500 of the high-speed shift circuit 200 in FIG. 21. However, unless any encoded word is detected, the first decision circuit 2600 directly outputs the foremost 8-bit data of the first data stream to the first register 2700 but it does not output any information to the first flag memory 3400. The first register 2700 makes the 8-bit data wait for the timing t1 and then, outputs the data to the second decision circuit 2800.

Then, at the timing t2, the second decision circuit 2800 of the time-sharing variable-length-encoded-word decoding circuit 300 in FIG. 22 performs the following operations. When the foremost encoded word of the first data stream is variable-length-decoded by the first decision circuit 2600 at the timing t1, the second decision circuit 2800 directly outputs the foremost encoded word to the second register 2900 but it does not output any information to the first flag memory 3400. The second register 2900 makes the foremost encoded word wait for the timing t2 and then, outputs the encoded word to the third decision circuit 3000. However, unless the foremost encoded word of the first data stream is variable-length-decoded by the first decision circuit 2600 at the timing t1, the second decision circuit 2800 detects presence or absence of an encoded word in the foremost 12-bit data of the first data stream by using the above uniquely-separable table and, when an encoded word is detected, variable-length-decodes the encoded word and outputs it to the third decision circuit 3000 through the second register 2900, and moreover outputs the information showing the number of bits of output data to the first flag memory 3400. The first flag memory 3400 outputs the information for the bits to the control circuit 2500 of the high-speed shift circuit 200 in FIG. 21. However, unless any encoded word is detected, the second decision circuit 2800 directly outputs the foremost 12-bit data wait of the first-data stream to the second register 2900 but it does not output any information to the first flag memory 3400. The second register 2900 makes the 12-bit data for the timing t2 and then, outputs the data to the third decision circuit 3000.

The first decision circuit 2600 of the time-sharing variable-length-encoded-word decoding circuit 300 detects presence or absence of an encoded word in the foremost 8-bit data wait of the second data stream at the same timing t2 and, when an encoded word is detected, variable-length-decodes the encoded word and outputs it to the second decision circuit 2800 through the first register 2700, and moreover outputs the information showing the number of bits of output data to the second flag memory 3500. The second flag memory 3500 outputs the information for the bits to the control circuit 2500 of the high-speed shift circuit 200 in FIG. 21. However, unless any encoded word is detected, the first decision circuit 2600 directly outputs the foremost 8-bit data of the second data stream to the first register 2700 but it does not output any information to the second flag memory 3500. The first register 2700 makes the 8-bit data wait for the timing t2 and then, outputs the data to the second decision circuit 2800.

Similarly, at the timing t3, the third decision circuit 3000 of the time-sharing variable-length-encoded-word decoding circuit 300 performs the following operations. When the foremost encoded word wait of the first data stream is variable-length-decoded by the first decision circuit 2600 or second decision circuit 2800 at the timing t1 or t2, the third decision circuit 3000 directly outputs the foremost encoded word to the third register 3100 but it does not output any information to the first flag memory 3400. The third register 3100 makes the foremost encoded word wait for the timing t3 and then, outputs it to the polarity adjustment circuit 3200. However, unless the foremost encoded word of the first data stream is variable-length-decoded at the timing t1 or t2, the third decision circuit 3000 detects an encoded word in the foremost 16-bit data of the first data stream, variable-length-decodes the encoded word and outputs it to the polarity adjustment circuit 3200 through the third register 3100, and moreover outputs the information showing the number of bits of output data to the first flag memory 3400. The first flag memory 3400 outputs the information for the bits to the control circuit 2500 of the high-speed shift circuit 200 in FIG. 21.

Then, at the same timing t3, the second decision circuit 2800 of the time-sharing variable-length-encoded-word decoding circuit 300 in FIG. 22 applies the same operation as that applied to the data of the first data stream to the data of the second data stream at the above timing t2. In this case, the flag memory used corresponds to the second flag memory 3500.

Then, at the same timing t3, the first decision circuit 2600 of the time-sharing variable-length-encoded-word decoding circuit 300 in FIG. 22 applies the same operation as that applied to the data of the first data stream to the data of the third data stream at the above timing t1. In this case, the flag memory used corresponds to the third flag memory 3600.

Thereafter, at the timing t4, the polarity adjustment circuit 3200 of the time-sharing variable-length-encoded-word decoding circuit 300 in FIG. 22 makes the polarity data related to positive or negative foremost encoded word of the first data stream already variable-length-decoded before the timing t4 positive or negative in accordance with the polarity data and outputs the data to the multiplexed-data separation circuit 400 through the fourth register 3300. At the same timing t4, the timing measurement circuit 3800 outputs the information showing that variable-length-decoded data is output to the multiplexed-data separation circuit 400 to the reset-signal generation circuit 3900 and the reset signal generation circuit 3900 resets the first flag memory 3400.

At the same timing t4, the third decision circuit 3000, second decision circuit 2800, and first decision circuit 2600 of the time-sharing variable-length-encoded-word decoding circuit 300 in FIG. 22 respectively apply the same operation as that applied to the data of the first data stream to the data values of the second, third, and fourth data streams at the above timing t3, t2, or t1. The flag memories used for the above case correspond to the second flag memory 3500, third flag memory 3600, and fourth flag memory 3700.

The high-speed shift circuit 200 in FIG. 19 inputs the information showing the number of bits of the data for the foremost encoded word of the first data stream from the first flag memory 3400 in FIG. 22 between the timings t1 and t3. That is, the circuit 200 inputs the information showing the number of bits of the encoded word A in FIG. 24. The high-speed shift circuit 200 shifts the data of the first data stream at the timing t4 in accordance with the above information so that the encoded word next to the foremost encoded word serves as the foremost encoded-word of the first data stream, in other words, so that the encoded word B in FIG. 24 serves as the foremost encoded word of the first data stream. When the shifting is performed, the high-speed shift circuit 200 inputs data from the data multiplexing circuit 100 so that the data of the first data stream becomes 64 bits. That is, the circuit 200 inputs the data for n bits. Hereafter, shifting performed by the high-speed shift circuit 200 is described by referring to the block diagram of the high-speed shift circuit 200 in FIG. 21.

The first selection circuit 1600, second selection circuit 1800, third selection circuit 2000, fourth selection circuit 2200, and fifth selection circuit 2400 in FIG. 21 respectively serve as circuits for designating whether to use the one-bit shift circuit 1500, two-bit shift circuit 1700, four-bit shift circuit 1900, eight-bit shift circuit 2100, or sixteen-bit shift circuit 2300. The designation is based on the control by the control circuit 2500. The one-bit shift circuit 1500, two-bit shift circuit 1700, four-bit shift circuit 1900, eight-bit shift circuit 2100, and sixteen-bit shift circuit 2300 respectively serve as circuits for shifting data streams by one bit, two bits, four bits, eight bits, and sixteen bits. The control circuit 2500 is a circuit for controlling the first selection circuit 1600, second selection circuit 1800, third selection circuit 2000, fourth selection circuit 2200, or fifth selection circuit 2400 to decide whether to use the one-bit shift circuit 1500, two-bit shift circuit 1700, four-bit shift circuit 1900, eight-bit shift circuit 2100, or sixteen-bit shift circuit 2300 respectively.

As described above, the control circuit 2500 inputs the information showing that the foremost encoded word of the first data stream, that is, the encoded word A serving as output data is n-bit data from the first flag memory 34,00 between the timings t1 and t3. The control circuit 2500 operates all or some of the one-bit shift circuit 1500, two-bit shift circuit 1700, four-bit shift circuit 1900, eight-bit shift circuit 2100, and sixteen-bit shift circuit 2300 to shift the first data stream in accordance with the information so that the number of bits corresponding to the word length of the output data is obtained through all or some of the first selection circuit 1600, second selection circuit 1800, third selection circuit 2000, fourth selection circuit 2200, and fifth selection circuit 2400. For example, when output data is 15-bit data, the control circuit 2500 operates the one-bit shift circuit 1500, two-bit shift circuit 1700, four-bit shift circuit 1900, and eight-bit shift circuit 2100 to shift the first data stream by 15 bits through the first selection circuit 1600, second selection circuit 1800, third selection circuit 2000, and fourth selection circuit 2200 at the timing t4.

Then, at the timing t5, the first decision circuit 2600 of the time-sharing variable-length-encoded-word decoding circuit 300 in FIG. 22 applies the same operation as that applied to the data of the first data stream to the data of the shifted first data stream.

At the same timing t5, the polarity adjustment circuit 3200 of the time-sharing variable-length-encoded-word decoding circuit 300 in FIG. 22 makes the polarity data related to positive or negative foremost encoded word of the second data stream already variable-length-decoded before the timing t4 positive or negative in accordance with the polarity data and outputs the data to the multiplexed-data separation circuit 400 through the fourth register 3300. At the same timing t5, the timing measurement circuit 3800 outputs the information showing that the variable-length-decoded data is output to the multiplexed-data separation circuit 400 to the reset-signal generation circuit 3900 and the reset-signal generation circuit 3900 resets the second flag memory 3500.

Then, at the same timing t5, each of the third decision circuit 3000 and second decision circuit 2800 of the time-sharing variable-length-encoded-word decoding circuit 300 in FIG. 22 apply the same operation as that applied to the data of the first data stream to the data of the third or fourth data stream respectively at the above timing t3 or t2. The flag memories used for the above case correspond to the third flag memory 3600 and fourth flag memory 3700 respectively.

The high-speed shift circuit 200 in FIG. 19 inputs the information showing the number of bits of the data for the foremost encoded word of the second data stream from the second flag memory 3500 in FIG. 22 between the timings t2 and t4. In accordance with the information, the high-speed shift circuit 200 shifts the data of the second data stream at the timing t5 so that the encoded word next to the foremost encoded word serves as the foremost encoded word of the second data stream. The shifting is performed so that the high-speed shift circuit 200 in FIG. 21 apparently shifts the data of the first data stream at the timing t4. Simultaneously with the shifting, the high-speed shift circuit 200 inputs data from the data multiplexing circuit 100 so that the data of the second data stream becomes 64 bits.

Then, as shown in FIG. 23, from the timing t6 downward, the variable-length-code decoder variable-length-decodes and outputs the foremost encoded word of the data of each data stream and moreover shifts the data of each data stream at cycles corresponding to t1 to t4 of the processing applied to the first data stream and at each timing as similar processing.

Embodiment 2 According to Third Aspect of the Present Invention

The configuration and operations of the variable-length-code decoder of the embodiment 2 according to the third aspect of the present invention are described below.

Though the configuration of the variable-length-code decoder of the embodiment 2 according to the third aspect of the present invention is the same as that of the variable-length-code decoder of the embodiment 1 according to the third aspect of the present invention, only the configuration and operations of a high-speed shit circuit 200 and operations of a time-sharing variable-length-encoded-word decoding circuit 300 are different. As for the embodiment 1, it is assumed that each encoded word of variable-length-encoded MPEG picture data is data of up to 16 bits. As for the embodiment 2, however, it is assumed that each encoded word is data of up to 32 bits. Therefore, as for the embodiment 2, only the configuration means and operations of the high-speed shift circuit 200 and operations of the time-sharing variable-length-encoded-word decoding circuit 300 are described.

Figure 25:
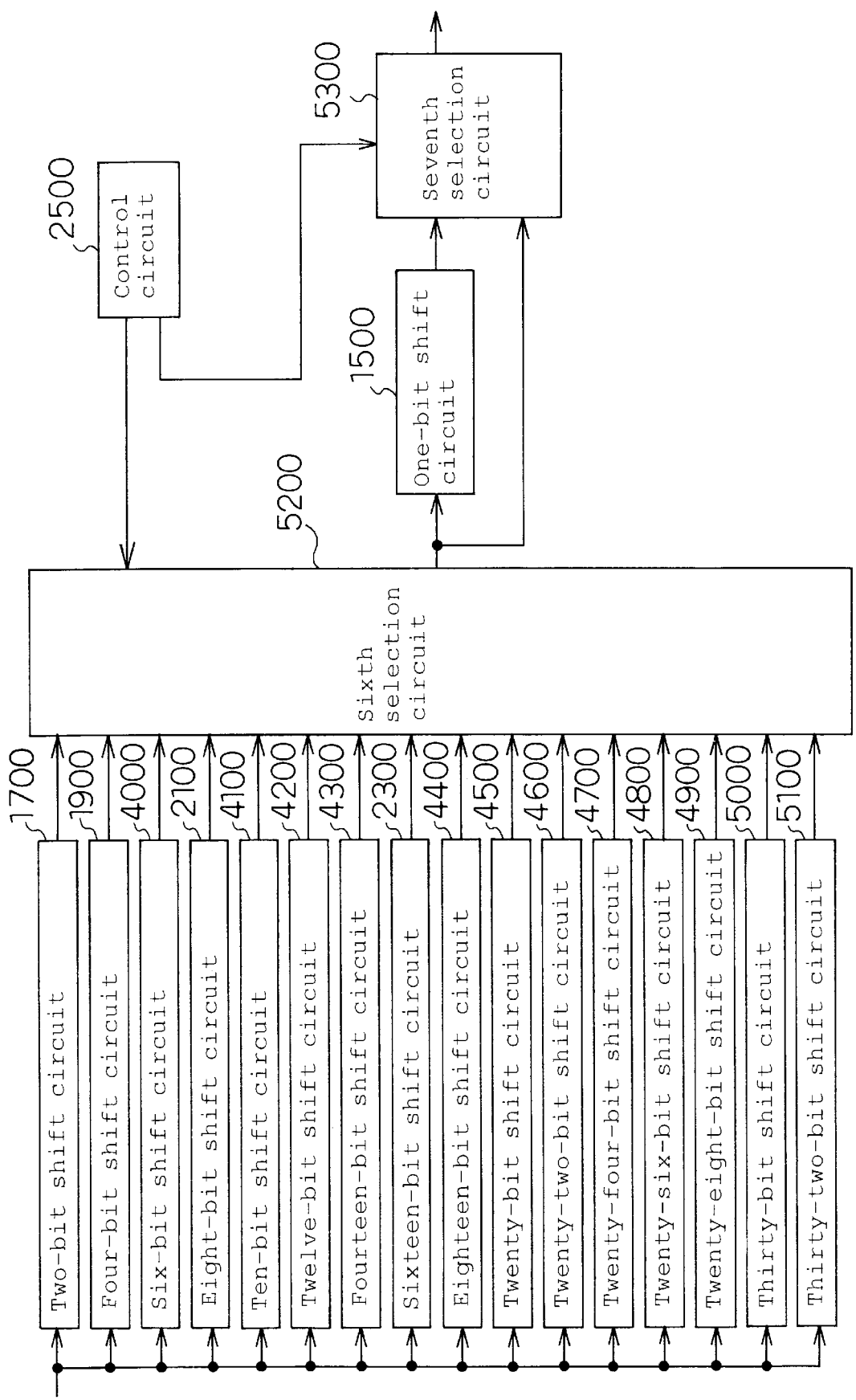
FIG. 25 is a block diagram of the high-speed shift circuit of the variable-length-code decoder of an embodiment 2 according to the third aspect of the present invention.
Figure 26:
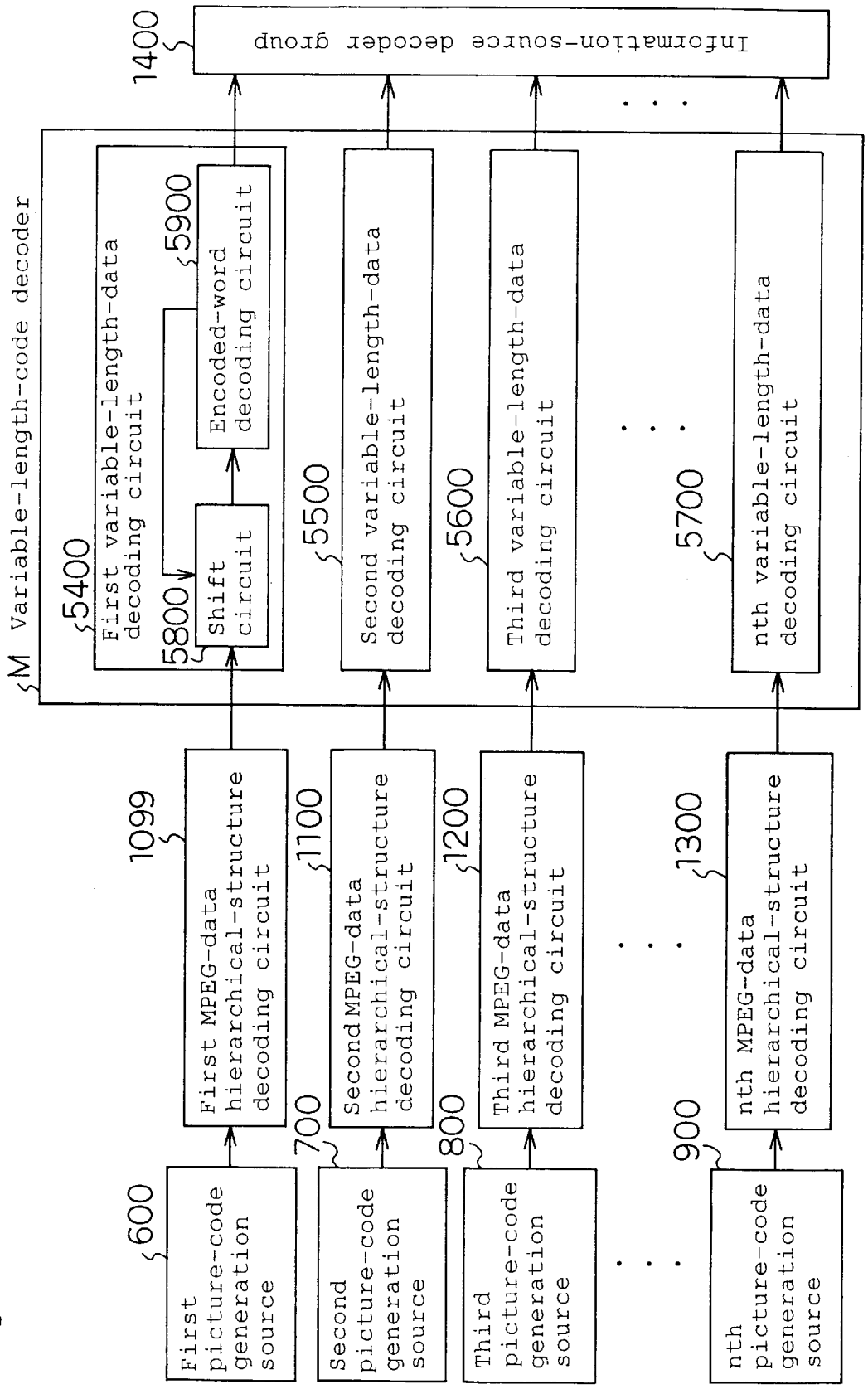
FIG. 26 shows a block diagram of a conventional variable-length-code decoder and an illustration for explaining operations of the variable-length-code decoder.

FIG. 25 shows a block diagram of the high-speed shift circuit 200 of the variable-length-code decoder of the embodiment 2. The high-speed shift circuit 200 is provided with a two-bit shift circuit 1700, a four-bit shift circuit 1900, a six-bit shift circuit 40, an eight-bit shift circuit 2100, a ten-bit shift circuit 4100, twelve-bit shift circuit 4200, a fourteen-bit shift circuit 4300, a sixteen-bit shift circuit 2300, an eighteen-bit shift circuit 4400, a twenty-bit shift circuit 4500, a twenty-two-bit shift circuit 4600, a twenty-four-bit shift circuit 4700, a twenty-six-bit shift circuit 4800, a twenty-eight-bit shift circuit 4900, a thirty-bit shift circuit 5000, a thirty-two-bit shift circuit 5100, a sixth selection circuit 5200, a one-bit shift circuit 1500, a seventh selection circuit 5300, and a control circuit 2500.

The two-bit shift circuit 1700, four-bit shift circuit 1900, eight-bit shift circuit 2100, sixteen-bit shift circuit 2300, one-bit shift circuit 1500, and control circuit 2500 are the same as those described for the embodiment 1. The six-bit shift circuit 4000, ten-bit shift circuit 4100, twelve-bit shift circuit 4200, fourteen-bit shift circuit 4300, eighteen-bit shift circuit 4400, twenty-bit shift circuit 4500, twenty-two-bit shift circuit 4600, twenty-four-bit shift circuit 4700, twenty-six-bit shift circuit 4800, twenty-eight-bit shift circuit 4900, thirty-bit shift circuit 5000, and thirty-two-bit shift circuit 5100 serves as circuits for shifting each data stream by 6, 10, 12, 14, 18, 20, 22, 24, 26, 28, 30, and 32 bits respectively. The sixth selection circuit 5200 serves as a circuit for designating a bit shift circuit to be used among the above bit shift circuits. The seventh selection circuit 5300 serves as a circuit for designating whether to use the one-bit shift circuit 1500. Designations by the sixth selection circuit 5200 and seventh selection circuit 5300 are based on the control by the control circuit 2500. The control circuit 2500 serves a circuit for controlling the sixth selection circuit 5200 to decide a bit shift circuit to be used among the above bit shift circuits except the one-bit shift circuit 1500. Moreover, the control circuit 2500 also serves as a circuit for controlling the seventh selection circuit 5300 to decide whether to use the one-bit shift circuit 1500.

Before the high-speed shift circuit 200 shifts each data stream, the control circuit 2500 inputs the information showing the number of bits to be shifted of a corresponding data stream. That is, the circuit 2500 inputs the number of bits of the output data of the time-sharing variable-length-encoded-word decoding circuit 300.

When the number of bits of the output data is an even number, the control circuit 2500 operates a bit shift circuit for the number of bits corresponding to the word length of the output data through the sixth selection circuit 5200 in accordance with the information for the number of bits of the output data to shift a corresponding data stream by the number of bits of the output data. In this case, the control circuit 2500 does not use the one-bit shift circuit 1500. For example, when the output data is 16-bit data, the control circuit 2500 operates the 16-bit shift circuit 2300 through the sixth selection circuit 5200 to shift a corresponding data stream by 16 bits.

When the number of bits of the output data is an odd number, the control circuit 2500 first operates a bit shift circuit for the number of bits one smaller than the number of bits of the word length of the output data through the sixth selection circuit 5200 in accordance with the information for the number of bits of the output data to shift a corresponding data stream by the number of bits one smaller than the number of bits of the word length of the output data. Then, the control circuit 2500 operates the one-bit shift circuit 1500 through the seventh selection circuit 5300 to shift the data stream by one more bit. For example, when the output data is 17-bit data, the control circuit 2500 first operates the sixteen-bit shift circuit 2300 through the sixth selection circuit 5200, shifts a corresponding data stream by 16 bits, and then operates the one-bit shift circuit 1500 through the seventh selection circuit 5300 to shift the data stream by one more bit, and thereby shifts the data stream up to 17 bits.

The configuration of the time-sharing variable-length-encoded-word decoding circuit 300 shown in FIG. 22 is the same as that described for the embodiment 1. However, because each encoded word for the embodiment 2 is data of up to 32 bits though each encoded word for the embodiment 1 is data of up to 16 bits, operations of the time-sharing variable-length-encoded-word decoding circuit 300 are different.

That is, the first decision circuit 2600 of the time-sharing variable-length-encoded-word decoding circuit 300 in FIG. 22 detects presence or absence of an encoded word in the foremost 16-bit data of each data stream and, when an encoded word is detected, variable-length-decodes the foremost encoded word and outputs it to the second decision circuit 2800 through the first register 2700. However, unless any encoded word is detected, the first decision circuit 2600 directly outputs the foremost 16-bit data of each data stream to the first register 2700.

Similarly, the second decision circuit 2800 of the time-sharing variable-length-encoded-word decoding circuit 300 detects presence or absence of an encoded word in the foremost 24-bit data of each data stream and, when an encoded word is detected, variable-length-decodes the foremost encoded word and outputs it to the third decision circuit 3000 through the second register 2900. However, unless any encoded word is detected, the second decision circuit 2800 directly outputs the foremost 24-bit data of each data stream to the second register 2900.

Still similarly, the third decision circuit 3000 of the time-sharing variable-length-encoded-word decoding circuit 300 detects the foremost encoded word in the foremost 32-bit data of each data stream and variable-length-decodes and outputs the encoded word to the polarity adjustment circuit 3200 through the third register 3100.

Then, the first decision circuit 2600, second decision circuit 2800, and third decision circuit 3000 respectively output the foremost variable-length-decoded encoded word and moreover, output the information showing the number of bits of output data to the first flag memory 3400 as for the data of the first data stream, to the second flag memory 3500 as for the data of the second data stream, to the third flag memory 3600 as for the data of the third data stream, and to the fourth flag memory 3700 as for the data of the fourth data stream. Each flag memory outputs the information for the bits to the control circuit 2500 of the high-speed shift circuit 200 in FIG. 21.

Input means according to the third aspect of the present invention uses the high-speed shift circuit 200 and variablelength-decoding means according to the third aspect of the present invention uses the time-sharing variable-length-encoded-word decoding circuit 300.

As for the above embodiments, it is assumed that the number of data streams is four. However, the number of data streams is not restricted to four. It is possible to use any number of data streams as long as the number of data streams is two or more. In short, the high-speed shift circuit 200 and time-sharing variable-length-encoded-word decoding circuit 300 can respectively use any circuit as long as the circuit operates as described below. That is, the high-speed shift circuit 200 successively continuously inputs the foremost data of every 64 bits of the variable-length-encoded MPEG picture data values of a plurality of data streams at timings different from each other. The high-speed shift circuit 200 inputs an MPEG picture data supplied from a data stream and then, before inputting the MPEG picture data supplied from the same data stream, the time-sharing variable-length-encoded-word decoding circuit 300 variable-length-decodes the foremost encoded word of the data stream and outputs the information for the word length of the foremost encoded word to the high-speed shift circuit 200. Moreover, the time-sharing variable-length-encoded-word decoding circuit 300 outputs a decoded word and the high-speed shift circuit 200 shifts the MPEG picture data having the same length as the decoded encoded word for the data stream of the data.

It is assumed that each encoded word of variable length-encoded MPEG picture data is data of up to 16 bits as for the embodiment 1 and it is assumed that each encoded word is data of up to 32 bits as for the embodiment 2. However, the maximum word length of each encoded word is not restricted to 16 or 32 bits.

As for the embodiment 1, it is assumed that the high-speed shift circuit 200 inputs the foremost 64 bits from each data stream. However, the number of bits to be input to the circuit 200 is not restricted to 64. It is enough for the high-speed shift circuit 200 to input data from each data stream so that the data quantity from each stream meets a predetermined value.

It is assumed that each of the first decision circuit 2600, second decision circuit 2800, and third decision circuit 3000 detects presence or absence of an encoded word in foremost 8-bit, 12-bit, or 16-bit data in each data stream and, when an encoded word is detected, variable-length-decodes the encoded word as for the embodiment 1 and detects presence or absence of an encoded word in foremost 16-bit, 24-bit, or 32-bit data in each data stream and, when an encoded word is detected, variable-length-decodes the encoded word as for the embodiment 2. However, the first decision circuit 2600, second decision circuit 2800, or third decision circuit 3000 is not restricted to the above-described one. In short, the circuits 2600, 2800, and 3000 can respectively use any circuit as long as the circuit detects presence or absence of an encoded word in data values having lengths different from each other and, when an encoded word is detected, variable-length-decodes the encoded word. The number of decision circuits is not restricted to three circuits such as the first decision circuit 2600, second decision circuit 2800, and third decision circuit 3000 as long as the number of decision circuits is two or more.

As for the above embodiments, it is assumed that the high-speed shift circuit 200 has a plurality of bit shift circuits for shifting the data constituted of a predetermined number of bits such as 1 bit or 4 bits for each data stream. In short, however, the high-speed shift circuit 200 can use any high-speed shift circuit as long as the circuit has a plurality of bit shift circuits for respectively shifting the data constituted of not only the above 1 bit or 4 bits but also a predetermined number of bits for each data stream.

As described above, the third aspect of the present invention makes it possible to provide a variable-length-code decoder having a small circuit scale and capable of performing variable-length decoding at a high speed.

Industrial Applicability

As described above, the first aspect of the present invention makes it possible to provide a picture processor for deforming a picture decoded from encoded picture data in accordance with the information for the degree of enlargement or contraction of each portion of the picture when decoding the data.

The second aspect of the present invention makes it possible to provide a picture data processor for flexibly processing a plurality of MPEG picture data values even when reproducing the MPEG picture-data values and simultaneously displaying a plurality of pictures on the display of a personal computer or the like.

The third aspect of the present invention makes it possible to provide a variable-length-code decoder having a small circuit scale and capable of performing variable-length decoding at a high speed.

What is claimed is:

1. A picture data processor comprising enlargement/contraction-information input means for inputting an information for a degree of enlargement/contraction for a plurality of picture data, picture processing means having a plurality of processing units for processing picture data to input and picture-process a plurality of picture data, and assignment means for inputting the information for the degree of enlargement/contraction from the enlargement/contraction-information input means and assigning all or part of the processing units of the picture processing means in accordance with the information for the degree of enlargement/contraction to the picture data enlarging/contracting processing which is corresponding to the information for the degree of enlargement/contraction; characterized in that the picture processing means processes a plurality of picture data in accordance with the information for the degree of enlargement/contraction and the assignment for the processing units.

2. The picture data processor according to claim 1, characterized in that the enlargement/contraction-information input means inputs an information about a priority of processing for the plurality of picture data and the assignment means assigns all or part of the processing units of the picture processing means to the processing of the picture data by considering the information about the priority of processing for the picture data.

3. The picture data processor according to claim 1, characterized in that the picture processing means uses a media processor.

\* \* \* \* \*

UNITED STATES PATENT AND TRADEMARK OFFICE
CERTIFICATE OF CORRECTION

PATENT NO. : 6,600,785 B1
DATED : July 29, 2003
INVENTOR(S) : Nishigori et al.

It is certified that error appears in the above-identified patent and that said Letters Patent is hereby corrected as shown below:

<u>Title page,</u>
Item [56], References Cited, please add the follwing four U.S. Patents:
-- 6,104,751 A * 8/2000 Artieri .................. 348/701
   6,184,935 A * 2/2001 Iaquinto ................. 348/441
   5,963,260 A * 10/1999 Bakhmutsky ........... 375/240.24
   6,175,592 A * 1/2001 Kim .................... 348/441 --

Signed and Sealed this

Tenth Day of February, 2004

JON W. DUDAS
*Acting Director of the United States Patent and Trademark Office*